United States Patent
Nagaoka

(10) Patent No.: US 10,778,040 B2
(45) Date of Patent: Sep. 15, 2020

(54) POWER TRANSMITTER

(71) Applicant: IHI Corporation, Tokyo (JP)

(72) Inventor: Shiro Nagaoka, Tokyo (JP)

(73) Assignee: IHI Corporation, Tokyo (JP)

(*) Notice: Subject to any disclaimer, the term of this patent is extended or adjusted under 35 U.S.C. 154(b) by 4 days.

(21) Appl. No.: 16/328,151

(22) PCT Filed: Aug. 24, 2017

(86) PCT No.: PCT/JP2017/030400
§ 371 (c)(1),
(2) Date: Feb. 25, 2019

(87) PCT Pub. No.: WO2018/043297
PCT Pub. Date: Mar. 8, 2018

(65) Prior Publication Data
US 2019/0199135 A1    Jun. 27, 2019

(30) Foreign Application Priority Data
Aug. 29, 2016  (JP) .................. 2016-166671

(51) Int. Cl.
*H02J 50/12*    (2016.01)
*H02J 50/80*    (2016.01)
(Continued)

(52) U.S. Cl.
CPC ............ *H02J 50/12* (2016.02); *H02J 50/80* (2016.02); *H02M 7/48* (2013.01); *H02M 7/5387* (2013.01);
(Continued)

(58) Field of Classification Search
CPC ............ H02J 50/12; H02J 50/80; H02M 7/48; H02M 7/5387; H02M 3/33569;
(Continued)

(56) References Cited

U.S. PATENT DOCUMENTS 6,160,374 A    12/2000  Hayes et al.
8,786,314 B2 *  7/2014  Maruyama .............. H02J 50/12
                                                    326/127
(Continued)

FOREIGN PATENT DOCUMENTS

JP    2000-078764 A    3/2000
JP    2004-254461 A    9/2004
(Continued)

OTHER PUBLICATIONS

International Search Report dated Oct. 31, 2017 for PCT Application No. PCT/JP2017/030400.

*Primary Examiner* — Jared Fureman
*Assistant Examiner* — Michael J Warmflash
(74) *Attorney, Agent, or Firm* — Volpe and Koenig, P.C.

(57) ABSTRACT

A power transmitter is a device for wirelessly supplying power to a power receiver, including: a power converter configured to convert power supplied from a power source into direct current (DC) power; a DC/alternating current (AC) converter configured to convert the DC power into AC power; a capacitor configured to be provided at an input of the DC/AC converter; and a controller configured to perform a discharge control of the capacitor after the power converter stops, wherein the controller performs the discharge control by changing at least one of a driving frequency and a phase shift amount of the DC/AC converter so that power supplied to the DC/AC converter by the capacitor is equal to or lower than withstand power of the DC/AC converter.

7 Claims, 18 Drawing Sheets

(51) Int. Cl.
  *H02M 7/48* (2007.01)
  *H02M 7/5387* (2007.01)
  *B60L 53/12* (2019.01)
  *B60L 53/55* (2019.01)

(52) U.S. Cl.
  CPC ............... *B60L 53/12* (2019.02); *B60L 53/55* (2019.02); *B60L 2210/40* (2013.01)

(58) Field of Classification Search
  CPC .... H02M 2001/322; H02M 1/32; H02M 1/36; B60L 53/12; B60L 53/55; B60L 2210/40
  See application file for complete search history.

(56) References Cited

U.S. PATENT DOCUMENTS

| | | | | |
|---|---|---|---|---|
| 9,831,712 | B2* | 11/2017 | Sadakata | ............ H02J 7/025 |
| 2012/0127765 | A1* | 5/2012 | Maruyama | ............ H02P 5/005 363/126 |
| 2012/0268079 | A1 | 10/2012 | Nakamura | |
| 2013/0009475 | A1 | 1/2013 | Nunoya et al. | |
| 2013/0100496 | A1 | 4/2013 | Kim | |
| 2014/0132212 | A1 | 5/2014 | Ichikawa et al. | |
| 2015/0028691 | A1 | 1/2015 | Yamauchi et al. | |
| 2015/0061577 | A1 | 3/2015 | Ye et al. | |
| 2015/0357863 | A1 | 12/2015 | Sadakata et al. | |
| 2016/0352139 | A1 | 12/2016 | Takatsu et al. | |
| 2017/0256993 | A1 | 9/2017 | Nakamura et al. | |

FOREIGN PATENT DOCUMENTS

| | | |
|---|---|---|
| JP | 2008-072840 A | 3/2008 |
| JP | 2009-130940 A | 6/2009 |
| JP | 2010-063294 A | 3/2010 |
| JP | 2012-125138 A | 6/2012 |
| JP | 2012-231556 A | 11/2012 |
| JP | 2013-005615 A | 1/2013 |
| JP | 2013-021769 A | 1/2013 |
| JP | 2013-110807 A | 6/2013 |
| JP | 2013-169132 A | 8/2013 |
| JP | 2013-192326 A | 9/2013 |
| JP | 2014-207794 A | 10/2014 |
| JP | 2015-065734 A | 4/2015 |
| JP | 2015-104220 A | 6/2015 |
| JP | 2015-223042 A | 12/2015 |
| JP | 2016-146689 A | 8/2016 |
| WO | 2014/129178 A1 | 8/2014 |
| WO | 2015/104779 A1 | 7/2015 |
| WO | 2015/141554 A1 | 9/2015 |
| WO | 2016/017143 A1 | 2/2016 |

* cited by examiner

Fig.9
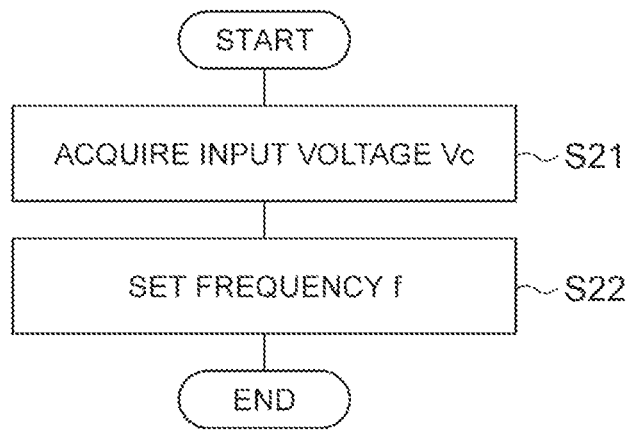
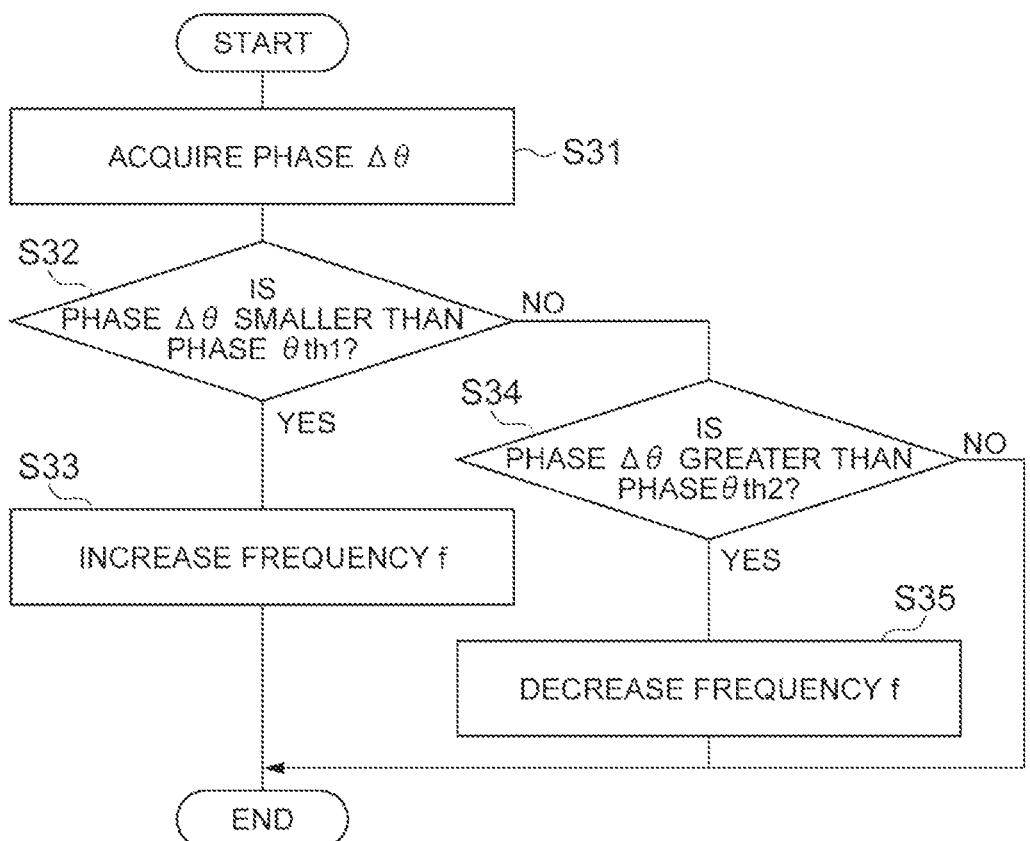

*Fig.13*
(a)
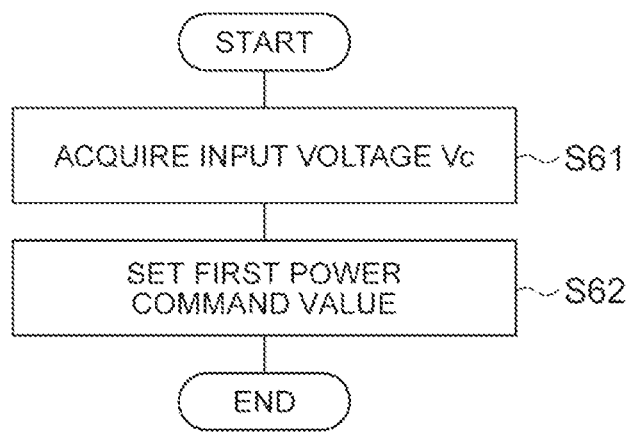
(b)
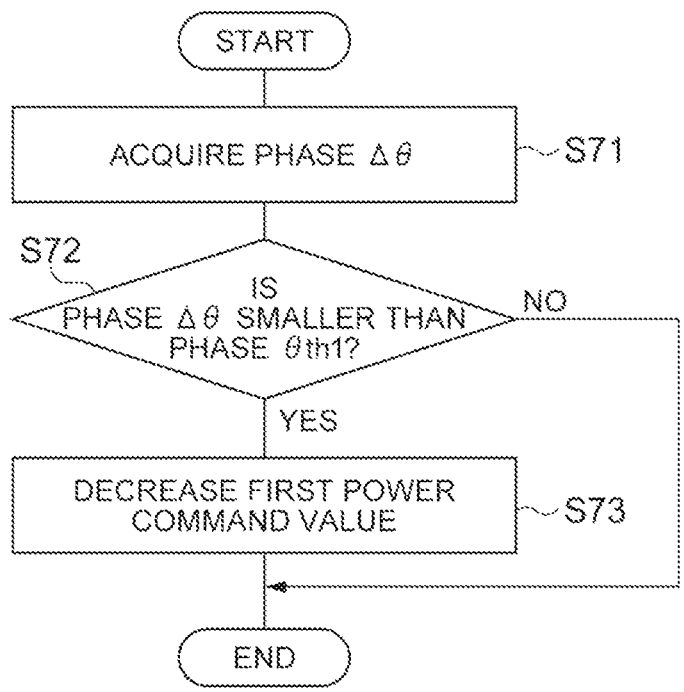

POWER TRANSMITTER

TECHNICAL FIELD

The present disclosure relates to a power transmitter.

BACKGROUND ART

When a capacitor is provided in an electronic device, an electric charge is accumulated in the capacitor after an operation of the electronic device is finished. The accumulated electric charge needs to be discharged (for example, see Patent Literature 1). In the technology disclosed in Patent Literature 1, an electric motor generator consumes the residual electric charge of the capacitor by driving an inverter after notification of completion of a charge control.

Although the technology disclosed in Patent Literature 1 targets the discharge of the capacitor between a boost converter and the inverter, the capacitor exists even in a wireless power transfer system (see Patent Literature 2, for example). In the wireless power transfer system disclosed in Patent Literature 2, a smoothing capacitor is provided at an input of the inverter of the primary-side wireless power transfer device (power transmitter).

CITATION LIST

Patent Literature

Patent Literature 1: Japanese Unexamined Patent Publication No. 2009-130940
Patent Literature 2: Japanese Unexamined Patent Publication No. 2015-223042

SUMMARY OF INVENTION

Technical Problem

In the wireless power transfer system, a resonance circuit can be provided in the wireless power transfer device as disclosed in Patent Literature 2. According to the configuration of the resonant circuit, power feeding characteristics may be changed depending on the amount of electric charge accumulated in the capacitor. Therefore, when the technology disclosed in Patent Literature 1 is applied only to the wireless power transfer system, for example, impedance when seeing a power receiver from the inverter is likely to be capacitive while the electric charge accumulated in the capacitor is discharged.

In this case, a method of switching an inverter becomes a hard switching method. A switching loss in the hard switching method is increased, and power consumed in elements included in the inverter is increased. Then, the power sometimes exceeds a withstand power of the elements included in the inverter. In order to increase the withstand power of the inverter, it is conceivable to adopt an element with high withstand power among the elements included in the inverter. However, there is a possibility that a size of the inverter is increased.

The present disclosure provides a power transmitter capable of discharging a capacitor without increasing a size of an inverter.

Solution to Problem

A power transmitter according to an aspect of the present disclosure is a device for wirelessly supplying power to a power receiver. The power transmitter includes: a power converter configured to convert power supplied from a power source into direct current (DC) power; a DC/alternating current (AC) converter configured to convert the DC power into AC power; a capacitor configured to be provided at an input of the DC/AC converter; and a controller configured to perform a discharge control of the capacitor after the power converter stops. The controller performs the discharge control by changing at least one of a driving frequency and a phase shift amount of the DC/AC converter so that power supplied to the DC/AC converter by the capacitor is equal to or lower than withstand power of the DC/AC converter.

Advantageous Effects of Invention

According to the present disclosure, it is possible to discharge the capacitor without causing the increase in size of the inverter.

BRIEF DESCRIPTION OF DRAWINGS

FIG. 9(*a*) is a flowchart illustrating in detail an example of frequency setting processing in FIG. 8.
FIG. 9(*b*) is a flowchart illustrating in detail another example of the frequency setting processing in FIG. 8.
FIG. 13(*a*) is a flowchart illustrating in detail an example of first power command value change processing in FIG. 12.
FIG. 13(*b*) is a flowchart illustrating in detail another example of the first power command value change processing in FIG. 12.

DESCRIPTION OF EMBODIMENTS

[1] Outline of Embodiments

Figure 1:
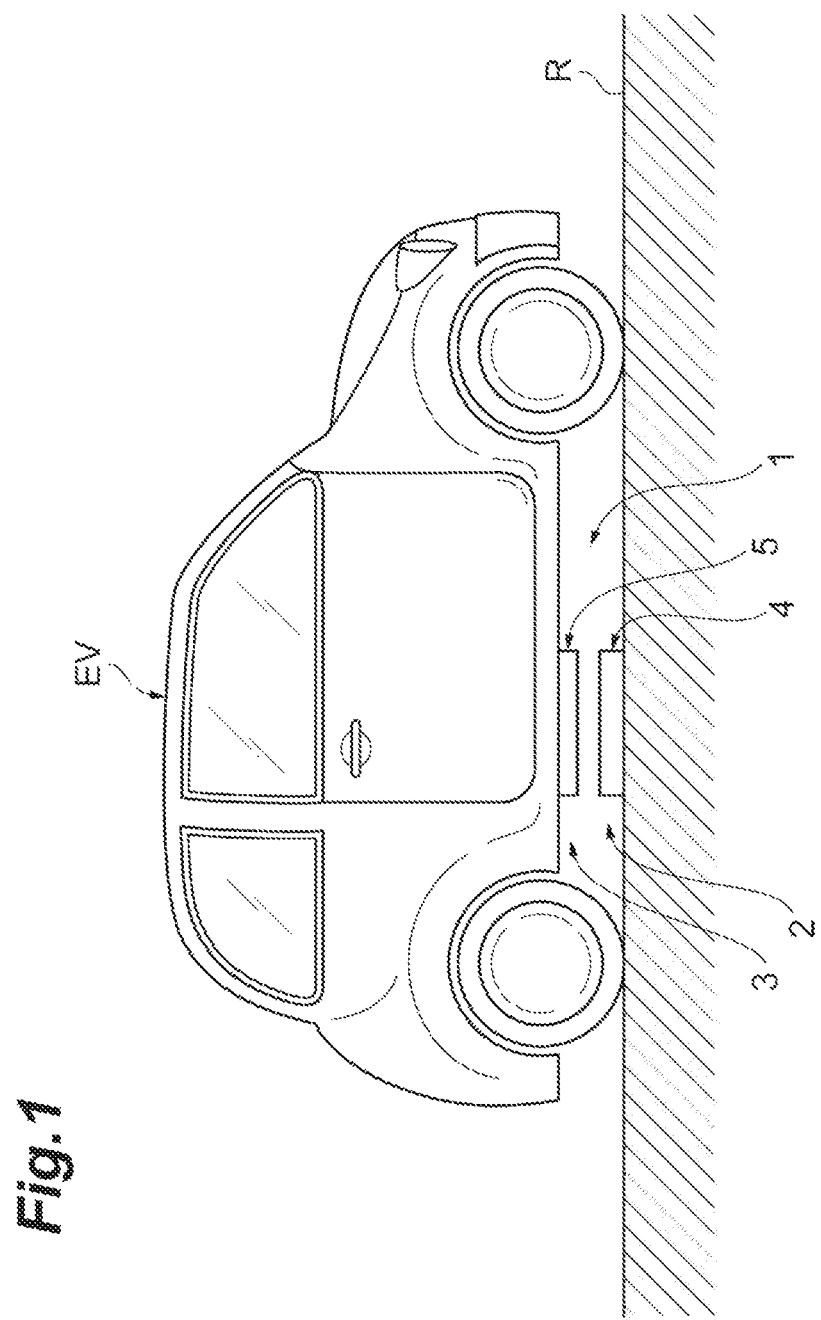
FIG. 1 is a diagram illustrating an application example of a wireless power transfer system including a power transmitter according to an embodiment.

A power transmitter according to an aspect of the present disclosure is a device for wirelessly supplying power to a power receiver. The power transmitter includes: a power converter configured to convert power supplied from a power source into DC power; a DC/AC converter configured to convert the DC power into AC power; a capacitor configured to be provided at an input of the DC/AC converter; and a controller configured to perform a discharge control of the capacitor after the power converter stops. The controller performs the discharge control by changing at least one of a driving frequency and a phase shift amount of the DC/AC converter so that power supplied to the DC/AC converter by the capacitor is equal to or lower than withstand power of the DC/AC converter.

In the power transmitter, even after the power converter stops, the DC/AC converter continues to be driven so that the power supplied to the DC/AC converter by the capacitor is equal to or lower than the withstand power of the DC/AC converter. Therefore, it is possible to continue to consume power (electric charge) accumulated in the capacitor without increasing the withstand power of the DC/AC converter. As a result, the capacitor can be discharged without increasing a size of the DC/AC converter.

In the discharge control, the controller may change at least one of the driving frequency and the phase shift amount of the DC/AC converter so that impedance when seeing the power receiver from the DC/AC converter becomes inductive. When the impedance when seeing the power receiver from the DC/AC converter becomes capacitive, switching of the DC/AC converter can be hard switching. Therefore, by making the impedance when seeing the power receiver from the DC/AC converter inductive, the switching of the DC/AC converter can be soft switching. Therefore, it is possible to continue to discharge the electric charge accumulated in the capacitor without increasing the withstand power of the DC/AC converter. As a result, the capacitor can be discharged without increasing the size of the DC/AC converter.

In the discharge control, the controller may change at least one of the driving frequency and the phase shift amount of the DC/AC converter so that the AC power is constant. In this case, the power constant control for keeping the AC power constant can be continued. As a result, it is possible to discharge the capacitor using the power constant control even after the power converter stops.

In the discharge control, the controller may change at least one of the driving frequency and the phase shift amount of the DC/AC converter so that the AC power is lower than AC power converted by the DC/AC converter while the power converter operates. As the magnitude of the AC power converted by the DC/AC converter is decreased, a phase of an output current is delayed relative to a phase of an output voltage of the DC/AC converter. Therefore, it is possible to lengthen the time when the DC/AC converter can be driven by the soft switching. This makes it possible to discharge the capacitor more reliably.

The DC/AC converter may include a switching element and a diode electrically connected in parallel with the switching element. In the discharge control, the controller may set a period during which a current flows in the same direction as a forward direction of the diode and the switching element is kept in an off state to be longer than a period during which a current flows in the same direction as a forward direction of the diode and the switching element is kept in an off state while the power converter operates. When the switching element electrically connected in parallel with the diode is turned off during the period in which the current flows in the same direction as the forward direction of the diode, power is consumed in the DC/AC converter as much as the forward voltage drop across the diode. By making the time to maintain the switching element in the off state longer than the time to operate the power converter, it is possible to increase the power consumption in the DC/AC converter and to efficiently discharge the capacitor.

[2] Examples of Embodiments

Hereinafter, embodiments of the present disclosure will be described in detail with reference to the accompanying drawings. In the description of the drawings, the same or equivalent elements are denoted by the same reference numerals and redundant explanation is omitted.

FIG. 1 is a diagram illustrating an application example of a wireless power transfer system including a power transmitter according to an embodiment. As illustrated in FIG. 1, a wireless power transfer system 1 includes a power transmitter 2 and a power receiver 3, and is a system for supplying power from the power transmitter 2 to the power receiver 3. The power transmitter 2 and the power receiver 3 are separated from each other, for example, in a vertical direction. The power transmitter 2 is installed in a parking lot or the like, for example. The power receiver 3 is mounted on an electric vehicle EV, for example. The wireless power transfer system 1 is configured to supply power to the electric vehicle EV arriving at the parking lot or the like, using inter-coil magnetic coupling such as a magnetic field resonance method and an electromagnetic induction method. It is to be noted that the wireless power transfer method is not limited to a method utilizing the magnetic coupling, but may be an electric field resonance method, for example.

The power transmitter 2 is a device for wirelessly supplying power to the power receiver 3. The power transmitter 2 generates desired AC power from power supplied by a power source PS (see FIG. 2), and transmits the generated AC power to the power receiver 3. The power transmitter 2 is installed on a road surface R such as a parking lot. The power transmitter 2 includes a first coil device 4 (power transmission coil device) provided so as to protrude upward from the road surface R such as the parking lot. The first coil device 4 includes a first coil 21 (see FIG. 2), and has a flat frustum shape or a rectangular parallelepiped shape, for example. The power transmitter 2 generates the desired AC power from the power source PS. The generated AC power is transmitted to the first coil device 4, so that the first coil device 4 generates a magnetic flux.

Figure 2:
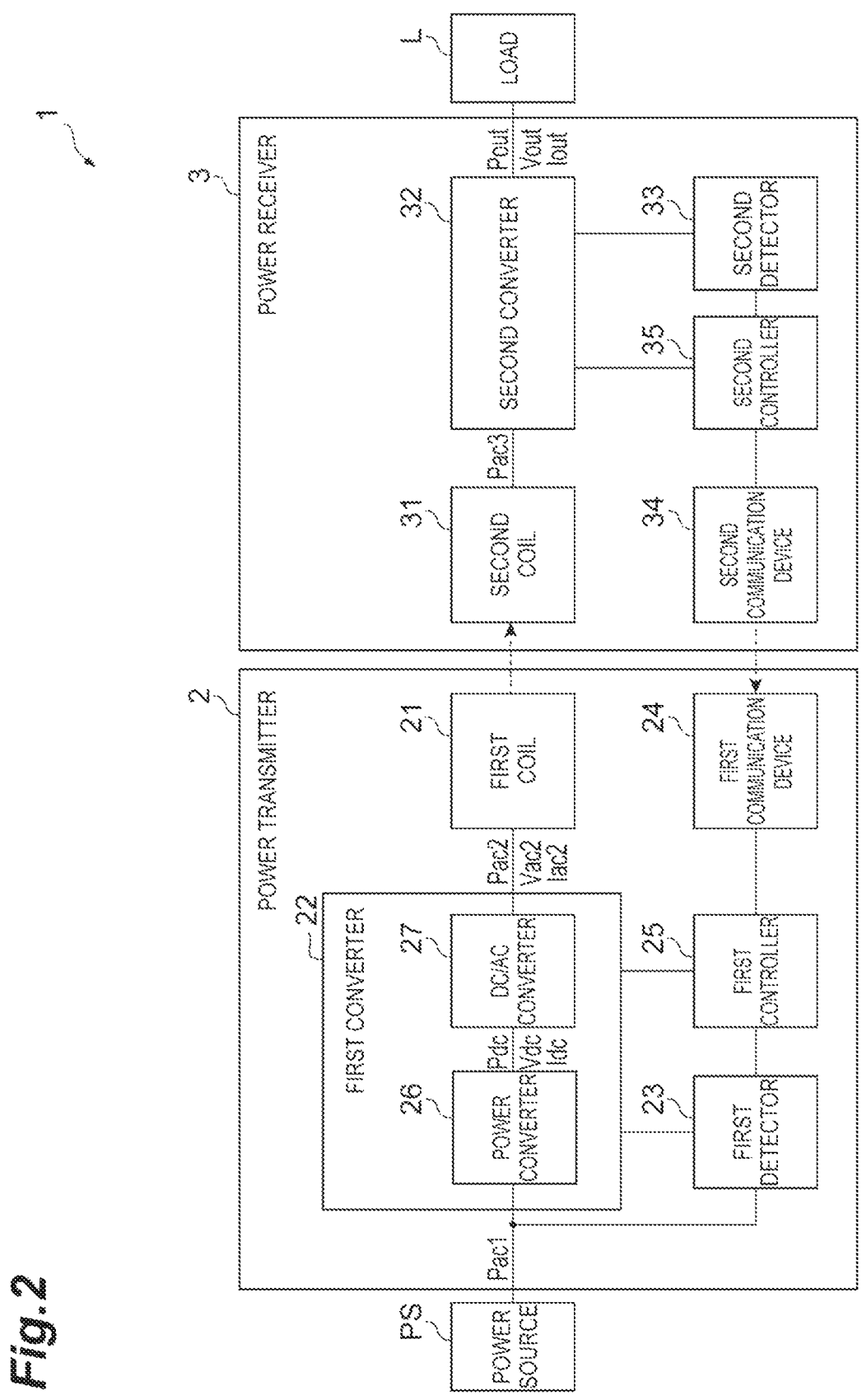
FIG. 2 is a circuit block diagram of the wireless power transfer system of FIG. 1.

The power receiver 3 is a device that receives power from the power transmitter 2 and supplies power to a load L (see FIG. 2). The power receiver 3 is mounted on the electric vehicle EV, for example. The power receiver 3 includes, for example, a second coil device 5 (power receiving coil device) attached to a bottom surface of a vehicle body (chassis or the like) of the electric vehicle EV. The second coil device 5 includes a second coil 31 (see FIG. 2), and faces the first coil device 4 while being spaced apart from each other in a vertical direction when power is supplied. The second coil device 5 has, for example, a flat frustum shape or a rectangular parallelepiped shape. The magnetic flux generated in the first coil device 4 interlinks with the second coil device 5, so that the second coil device 5 generates an induced current. Thereby, the second coil device 5 receives power from the first coil device 4 in a wireless manner. The power received by the second coil device 5 is supplied to the load L.

With reference to FIG. 2, a circuit configuration of the wireless power transfer system 1 is described in detail. FIG. 2 is a circuit block diagram of the wireless power transfer system of FIG. 1. As illustrated in FIG. 2, the wireless power transfer system 1 is a system for receiving AC power Pac1 from the power source PS and supplying load power Pout to the load L. The power source PS may be an AC power source such as a commercial power source, and supplies the AC power Pac1 to the power transmitter 2. A frequency of the AC power Pac1 is, for example, 50 Hz or 60 Hz. The load L may be a DC load such as a battery or an AC load such as an electric motor.

The power transmitter 2 is supplied with the AC power Pact from the power source PS. The power transmitter 2 includes a first coil 21, a first converter 22, a first detector 23, a first communication device 24, and a first controller 25.

The first converter 22 is a circuit that converts the AC power Pact supplied from the power source PS into desired AC power Pac2 and supplies the converted AC power Pac2 to the first coil 21. The first converter 22 can change a magnitude of the AC power Pac2 by, for example, a frequency control, a phase shift control, and a voltage control of DC power Pdc, which will be described later. The first converter 22 includes a power converter 26 and a DC/AC converter 27.

The power converter 26 is an AC/DC converter that converts the AC power Pac1 supplied from the power source PS into the DC power Pdc. The power converter 26 is, for example, a rectifier circuit. The rectifier circuit may be constituted by a rectifying element such as a diode or may be constituted by a switching element such as a transistor. The power converter 26 may further include a power factor correction (PFC) function and a step-up/step-down function. The first converter 22 may further include a DC/DC converter that is provided at an output of the power converter 26. The power converter 26 is controlled by the first controller 25 so as to change a magnitude of a voltage Vdc of the DC power Pdc. The power converter 26 changes the magnitude of the voltage Vdc of the DC power Pdc by pulse width modulation, for example. The power converter 26 supplies the converted DC power Pdc to the DC/AC converter 27.

The DC/AC converter 27 converts the DC power Pdc converted by the power converter 26 into the AC power Pac2. A frequency of the AC power Pac2 is, for example, 81.38 kHz to 90 kHz. The DC/AC converter 27 includes an inverter circuit. Here, a capacitor is provided at the input of the DC/AC converter 27. The capacitor provided at the input of the DC/AC converter 27 may be provided separately from the DC/AC converter 27, and as in the present embodiment, may be provided at an input stage as a part of the DC/AC converter 27. That is, the DC/AC converter 27 includes a capacitor 42 (see FIG. 3) provided at the input of the inverter circuit. The first converter 22 may further include a transformer that is provided at the output of the DC/AC converter 27. The DC/AC converter 27 is controlled by the first controller 25 so as to change the magnitude of the AC power Pac2. The DC/AC converter 27 supplies the converted AC power Pac2 to the first coil 21. The detailed configuration of the DC/AC converter 27 will be described later.

The first coil 21 is a coil for wirelessly feeding power to the power receiver 3. The first coil 21 generates a magnetic flux by supplying the AC power Pac2 from the first converter 22. A capacitor and an inductor (for example, a reactor) may be connected between the first coil 21 and the first converter 22.

The first detector 23 includes a circuit for acquiring a measurement value relating to the DC power Pdc. The circuit for obtaining the measurement value relating to the DC power Pdc is, for example, a voltage sensor, a current sensor, or a combination thereof. The first detector 23 measures the DC power Pdc, the voltage Vdc of the DC power Pdc, or a current Idc of the DC power Pdc. The first detector 23 measures the AC power Pac2, a voltage Vac2 of the AC power Pac2, and a current Iac2 of the AC power Pac2. The first detector 23 outputs the acquired measurement value to the first controller 25.

The first communication device 24 is a circuit for wirelessly communicating with the second communication device 34 of the power receiver 3 to be described later. The first communication device 24 includes, for example, an antenna for a communication system using radio waves, or a light emitting device and a light receiving device for a communication system using an optical signal. The first communication device 24 outputs the information received from the power receiver 3 to the first controller 25.

The first controller 25 is a processing device such as a central processing unit (CPU) and a digital signal processor (DSP). The first controller 25 may include a read only memory (ROM), a random access memory (RAM), an interface circuit connected to each part of the power transmitter 2, and the like.

The first controller 25 calculates the first power measurement value based on the measurement value of the current Idc detected by the first detector 23. The first power measurement value is a measurement value including a loss of the DC/AC converter 27, a loss of the first coil 21, and the like and the AC power Pac2 supplied from the DC/AC converter 27 to the first coil 21. The first controller 25 calculates the first power command value based on a second power command value received from the power receiver 3 via the first communication device 24. As the power constant control, the first controller 25 performs the power control that controls the first converter 22 based on the first power measurement value (AC power Pac2) and the first power command value so that the first power measurement value approaches the first power command value.

The first controller 25 may perform a command value correction control for correcting the first power command value. As the command value correction control, the first controller 25 performs the power control that controls the first converter 22 based on the second power measurement value (described later) and the second power command value (described later) received from the power receiver 3 via the first communication device 24 so that the second power measurement value (load power Pout) approaches the second power command value. Specifically, the first controller 25 corrects the first power command value so that the second power measurement value approaches the second power command value.

As the power control, the first controller 25 controls the magnitude of the AC power Pac2 by controlling the first converter 22 and controls the magnitude of the load power Pout supplied to the load L. The power control is performed using at least one of the frequency control, the phase shift control, and the voltage control of the DC power Pdc. In each control, a power control parameter for controlling the magnitude of the AC power Pac2 is changed.

The first controller 25 performs the frequency control that changes the magnitude of the AC power Pac2 and the load power Pout by changing a frequency f of the AC power Pac2. The above-described power control parameter in the frequency control is the driving frequency of the DC/AC converter 27 (inverter circuit). The frequency of the AC power Pac2 is the frequency of the AC current or AC voltage output from the first converter 22.

The first controller 25 performs the phase shift control which changes the magnitude of the AC power Pac2 and the load power Pout by changing an ON period of the DC/AC converter 27 (inverter circuit). For example, when the DC/AC converter 27 is the inverter circuit, the first controller 25 adjusts a supply time of a driving signal to the plurality of switching elements included in the inverter circuit to change an ON period of each switching element. The above-described power control parameter in the phase shift control is an ON period of the inverter circuit.

The first controller 25 performs the voltage control that changes the magnitude of the AC power Pac2 and the load power Pout by changing the magnitude of the voltage Vdc of the DC power Pdc. The change in the voltage Vdc of the DC power Pdc is performed, for example, by using the step-up/step-down function of the power converter 26 described above. The above-described power control parameter in the control of the DC power Pdc is the magnitude of the voltage Vdc of the DC power Pdc. The step-up/step-down function can be realized by, for example, a chopper circuit.

When receiving a charging stop request, the first controller 25 performs the discharge control of the capacitor 42 (see FIG. 3) of the DC/AC converter 27 while operating the second converter 32. The discharge control is a control that discharges the electric charge accumulated in the capacitor 42 of the DC/AC converter 27. The first controller 25 receives the charging stop request from, for example, the power receiver 3 via the first communication device 24. Further, the first controller 25 receives the charging stop request in response to pressing of a charging stop button provided in the power transmitter 2. Details of the discharge control will be described later.

The power receiver 3 includes a second coil 31, a second converter 32, a second detector 33, a second communication device 34, and a second controller 35.

The second coil 31 is a coil for wirelessly receiving power supplied from the power transmitter 2. The magnetic flux generated by the first coil 21 interlinks with the second coil 31 to generate AC power Pac3 in the second coil 31. The second coil 31 supplies the AC power Pac3 to the second converter 32. A capacitor and an inductor (for example, a reactor) may be connected between the second coil 31 and the second converter 32.

The second converter 32 is a circuit that converts the AC power Pac3 received by the second coil 31 into the desired load power Pout by the load L. When the load L is a DC load, the second converter 32 is an AC/DC converter (rectifier circuit) that converts the AC power Pac3 into the DC load power Pout. In this case, the second converter 32 may include a step-up/step-down function for outputting the desired load power Pout by the load L. The step-up/step-down function can be realized by, for example, a chopper circuit or a transformer. The second converter 32 may further include the transformer that is provided at the input of the AC/DC converter.

When the load L is the AC load, the second converter 32 further includes a DC/AC converter (inverter circuit) in addition to an AC/DC converter that converts the AC power Pac3 into DC power. The DC/AC converter converts the DC power converted by the AC/DC converter into AC load power Pout. The second converter 32 may further include the transformer that is provided at the input of the AC/DC converter. In addition, the second converter 32 may further include a clamp circuit for preventing a destruction of the circuit. Usually, when the charging stops, a relay connected from the second converter 32 to the load L does not stop, but when a relay connected from the second converter 32 to the load L stops due to abnormality or the like, the clamp circuit may also be used to consume power. When the AC power Pac3 supplied from the second coil 31 is the desired AC power by the load L, the second converter 32 can be omitted.

The second detector 33 is a circuit for acquiring the measurement value relating to the load power Pout supplied to the load L. The second detector 33 measures a load voltage Vout, a load current Iout, or the load power Pout supplied to the load L. The second detector 33 is, for example, a voltage sensor, a current sensor, or a combination thereof. The second detector 33 outputs the acquired measurement value to the second controller 35. The load L outputs the second power command value to the second controller 35. The second power command value indicates the magnitude of the desired power to be supplied to the load L. For example, when the load L is a storage battery, the second power command value may be a command value of current, voltage, or power which is set in accordance with a state of charge (SOC) of the load L.

The second communication device 34 is a circuit for wirelessly communicating with the first communication device 24 of the power transmitter 2. The power receiver 3 can communicate with the power transmitter 2 by the second communication device 34. The second communication device 34 includes, for example, an antenna for a communication system using radio waves, or a light emitting device and a light receiving device for a communication system using an optical signal. The second communication device 34 transmits the information received from the second controller 35 to the power transmitter 2.

The second controller 35 is a processing device such as a CPU and a DSP. The second controller 35 may include a ROM, a RAM, an interface circuit connected to each unit of the power receiver 3, and the like. The second controller 35 calculates the second power measurement value based on the measurement value received from the second detector 33. The second controller 35 transmits the second power measurement value and the second power command value received from the load L to the power transmitter 2 via the second communication device 34.

For example, when a storage battery of an electric vehicle is connected to the power transmitter 2 instead of the power source PS, and the power source PS is connected to the power receiver 3 instead of the load L, power can be transmitted from the power receiver 3 to the power transmitter 2.

Figure 3:
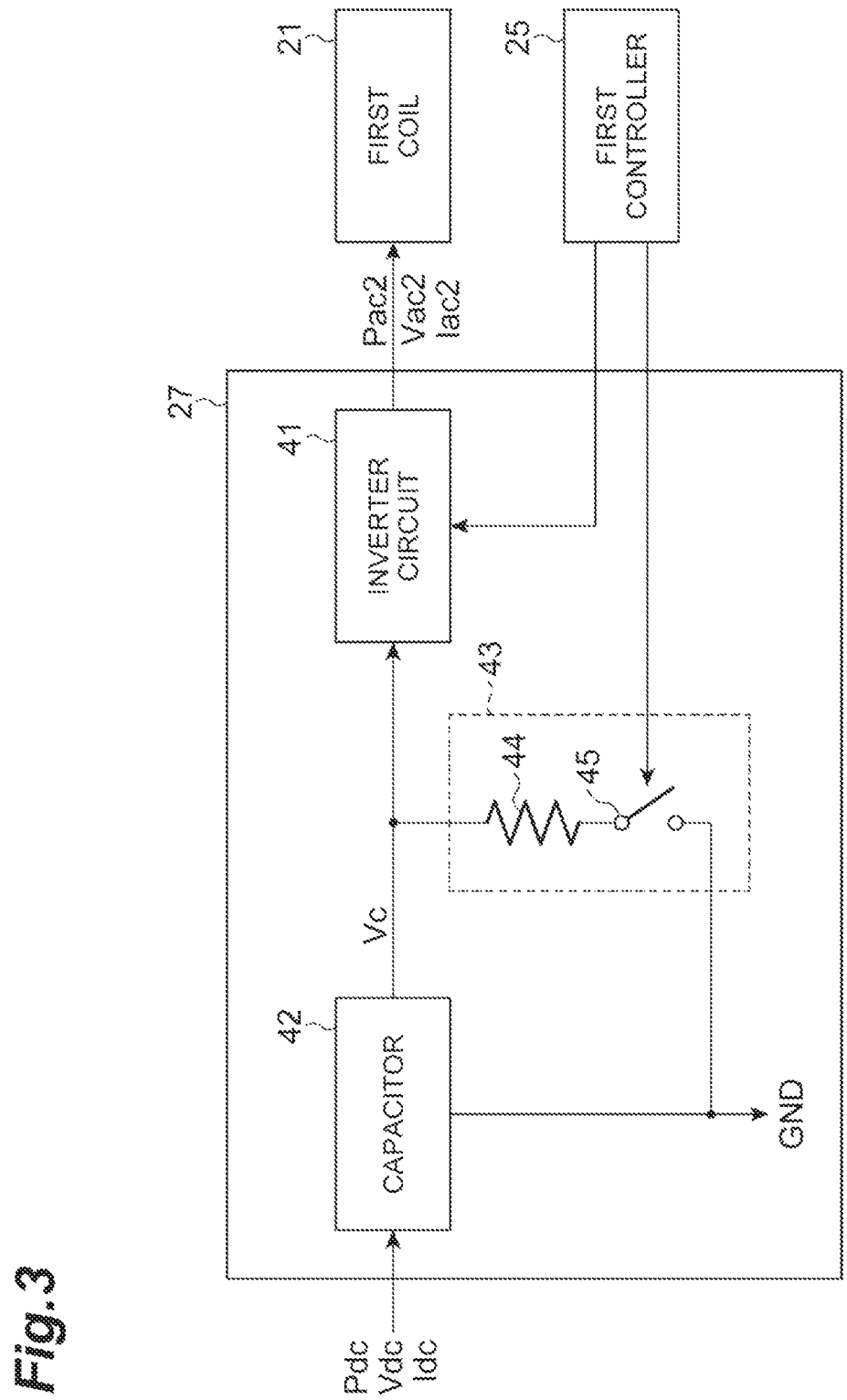
FIG. 3 is a schematic diagram relating to a discharge control.
Figure 4:
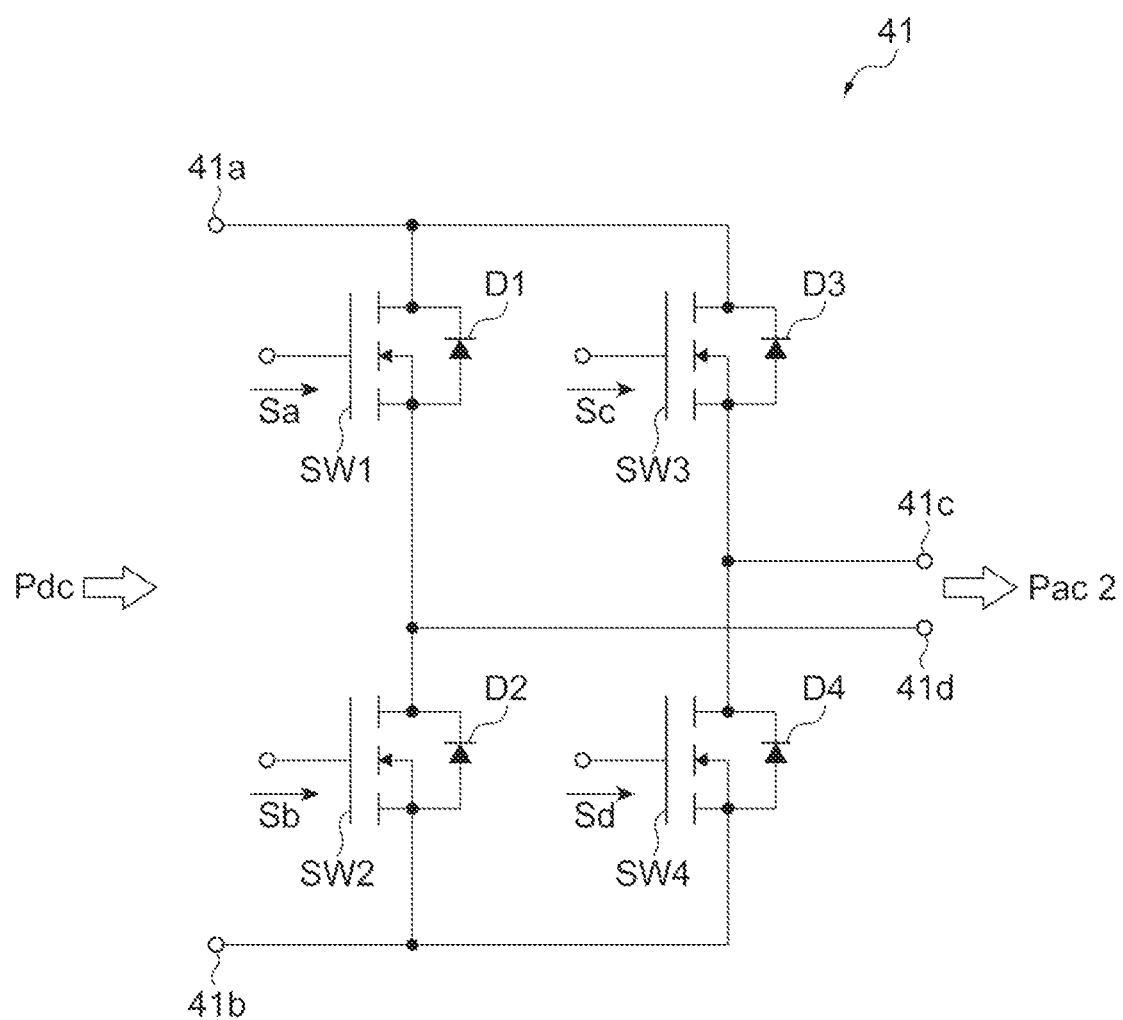
FIG. 4 is a circuit diagram of an inverter circuit of FIG. 3.

Next, the discharge control will be described in detail. First, a circuit configuration used for the discharge control will be described with reference to FIGS. 3 and 4. FIG. 3 is a schematic diagram relating to the discharge control. FIG. 4 is a circuit diagram of the inverter circuit of FIG. 3. As illustrated in FIG. 3, the DC/AC converter 27 includes an inverter circuit 41, a capacitor 42, and a forced discharge circuit 43.

As illustrated in FIG. 4, the inverter circuit 41 is a full bridge inverter, and includes switching elements SW1 to SW4 and diodes D1 to D4. The switching elements SW1 to SW4 are elements capable of switching electrical opening and closing. That is, switching is made between an on state in which both ends of the switching elements SW1 to SW4 are electrically conductive and an off state in which both ends thereof are electrically cut off. As the switching elements SW1 to SW4, for example, a metal oxide semiconductor field effect transistor (MOSFET), an insulated gate bipolar transistor (IGBT), a bipolar transistor and the like are used. In the example illustrated in FIG. 4, the switching elements SW1 to SW4 are N-channel MOSFETs.

Input terminals 41a and 41b of the inverter circuit 41 are connected to both ends of the capacitor 42. The switching element SW1 and the switching element SW2 are electrically connected in series between the input terminals 41a and 41b. In FIG. 4, a drain of the switching element SW1 is connected to the input terminal 41a, and a source of the switching element SW2 is connected to the input terminal 41b. A source of the switching element SW1 and a drain of the switching element SW2 are connected to each other and are connected to an output terminal 41d of the inverter circuit 41. Similarly, a switching element SW3 and a switching element SW4 are electrically connected in series between the input terminals 41a and 41b. In FIG. 4, a drain of the switching element SW3 is connected to the input terminal 41a, and a source of the switching element SW4 is connected to the input terminal 41b. A source of the switching element SW3 and a drain of the switching element SW4 are connected to each other and are connected to an output terminal 41c of the inverter circuit 41. The output terminal 41c is connected to one end of the first coil 21, and the output terminal 41d is connected to the other end of the first coil 21.

Driving signals Sa to Sd are supplied from the first controller 25 to gates of the switching elements SW1 to SW4, respectively. The switching elements SW1 to SW4 switch between the on state and the off state in accordance with the driving signals Sa to Sd output from the first controller 25.

The diodes D1 to D4 are electrically connected in parallel with the switching elements SW1 to SW4, respectively. Cathodes of the diodes D1 to D4 are connected to the drains of the switching elements SW1 to SW4, respectively and anodes of the diodes D1 to D4 are connected to the sources of the switching elements SW1 to SW4, respectively. The inverter circuit 41 may be a half-bridge inverter.

The capacitor 42 is, for example, a smoothing capacitor. As the capacitor 42, for example, an electrolytic capacitor is used. The capacitor 42 is provided at an input portion of the DC/AC converter 27. That is, the capacitor 42 is provided between the power converter 26 and the inverter circuit 41.

The forced discharge circuit 43 is a circuit that forcibly discharges the charge accumulated in the capacitor 42. The forced discharge circuit 43 is electrically connected in parallel with the capacitor 42. The forced discharge circuit 43 includes a resistance element 44 and a switching element 45 that are electrically connected in series. One end of the resistance element 44 is connected to an electric wire for supplying output from the electric power converter 26 to the inverter circuit 41, and the other end of the resistance element 44 is connected to one end of the switching element 45. The other end of the switching element 45 is connected to a ground potential (GND).

The switching element 45 is an element capable of switching electrical opening and closing. That is, switching is made between an on state in which both ends of the switching element 45 are electrically conductive and an off state in which both ends thereof are electrically cut off. Examples of the switching element 45 include a semiconductor switch, a mechanical relay, and the like. The switching element 45 switches between the on state and the off state in accordance with a forced discharge signal output from the first controller 25. The forced discharge circuit 43 is not indispensable, and the DC/AC converter 27 may not include the forced discharge circuit 43.

Figure 5:
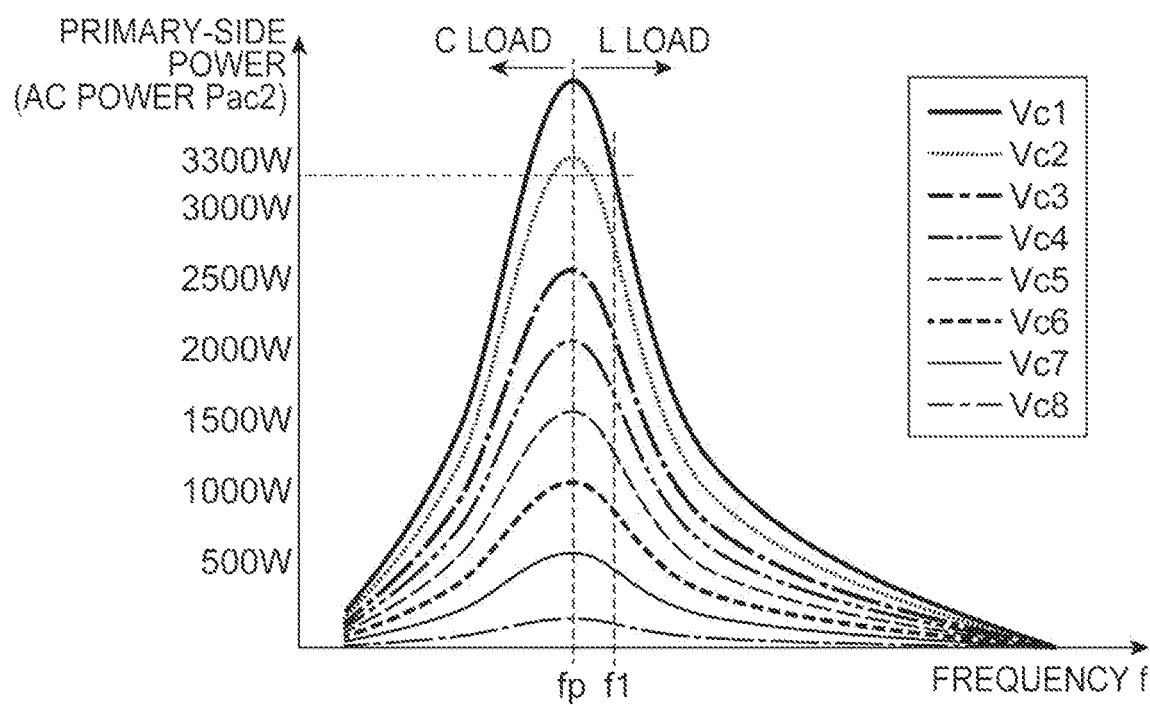
FIG. 5 is a diagram illustrating an example of power characteristics.
Figure 6:
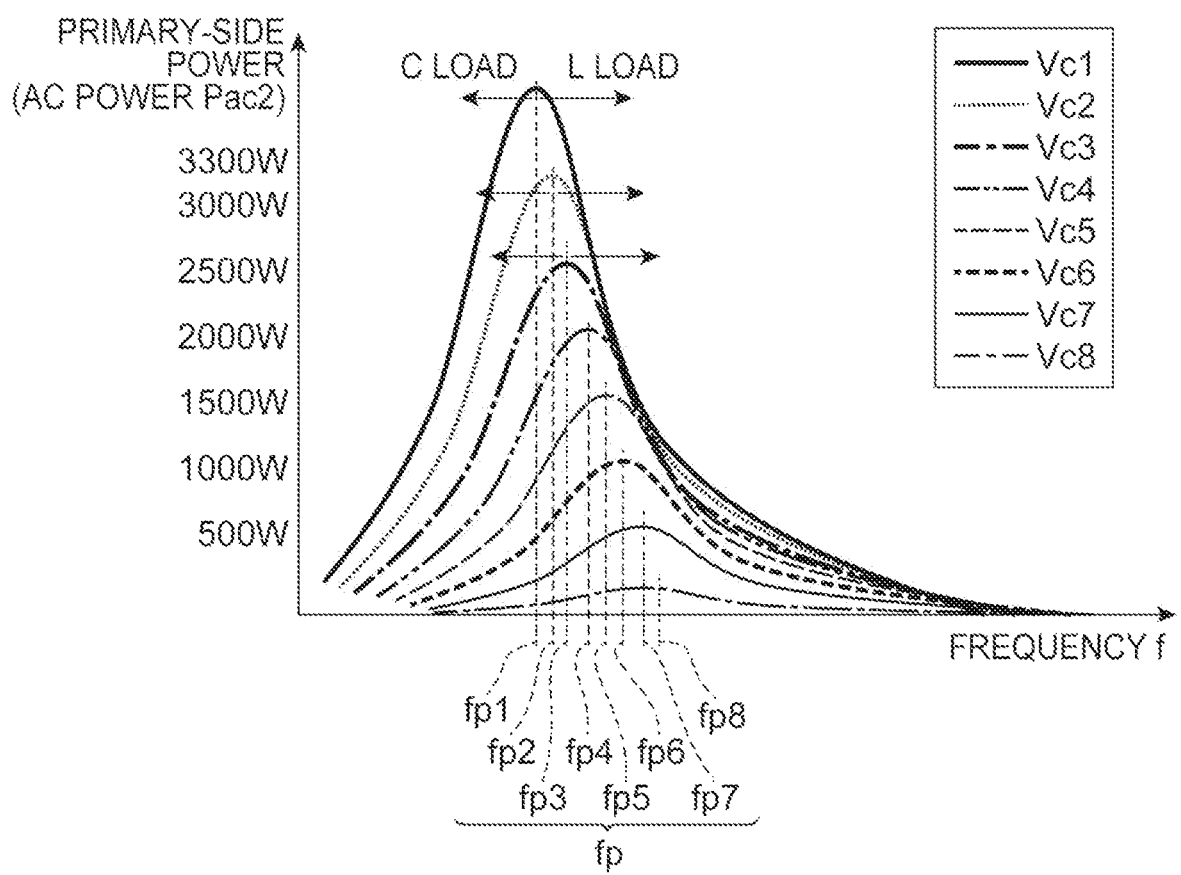
FIG. 6 is a diagram illustrating another example of the power characteristics.
Figure 7:
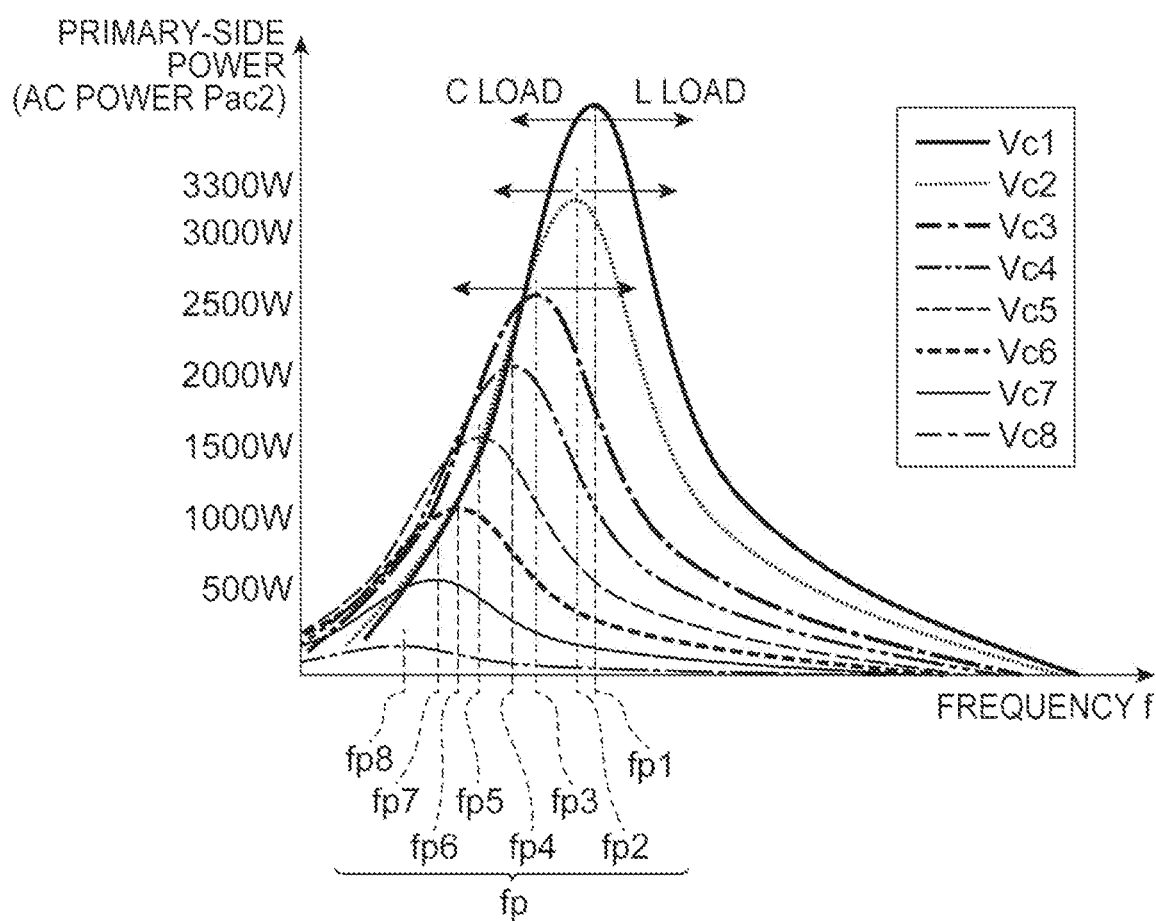
FIG. 7 is a diagram illustrating still another example of the power characteristics.

Here, the frequency characteristics (hereinafter, referred to as "power characteristics") of the AC power Pac2 will be described with reference to FIGS. 5 to 7. FIG. 5 is a diagram illustrating an example of the power characteristics. FIG. 6 is a diagram illustrating another example of the power characteristics. FIG. 7 is a diagram illustrating still another example of the power characteristics. In the graphs of FIGS. 5 to 7, a horizontal axis represents a frequency f, and a vertical axis represents (the magnitude of) the AC power Pac2. The frequency f is the frequency of the AC power Pac2. It is assumed that an input voltage Vc of the DC/AC converter 27 (inverter circuit 41) is decreased from an input voltage Vc1 to an input voltage Vc8 in this order. The input voltage Vc is determined in accordance with the electric charge accumulated in the capacitor 42, and the input voltage Vc is increased as the charge amount accumulated in the capacitor 42 is increased.

As illustrated in FIGS. 5 to 7, the power characteristics are changed in accordance with the input voltage Vc. Specifically, as the input voltage Vc is decreased, a maximum value of the AC power Pac2 at which the DC/AC converter 27 can output is decreased. Further, when the input voltage Vc is constant, the magnitude of the AC power Pac2 is changed in accordance with the frequency f. As the frequency f, for example, 81.38 kHz to 90 kHz can be used. As the frequency f is changed, impedance of reactance elements such as the coil and the capacitor is changed, and the AC power Pac2 is changed. In this way, the first controller 25 performs the frequency control that changes the magnitude of the AC power Pac2 by changing the frequency f.

A frequency fp, which is the frequency f for causing the DC/AC converter 27 to output the maximum AC power Pac2 that can be output by the DC/AC converter 27 with respect to the input voltage Vc, is a frequency at a boundary whether the impedance when seeing the power receiver 3 from the DC/AC converter 27 becomes inductive (L load) or capacitive (C load). Specifically, this impedance is impedance when seeing the power receiver 3 from the output of the DC/AC converter 27, and the impedance is the L load at the frequency f greater than the frequency fp, and is the C load at the frequency f lower than the frequency fp.

The L load is realized by making a phase θi of the output current (current Iac2 of the AC power Pac2) be equal to or delayed more than a phase θv of the output voltage (voltage Vac2 of the AC power Pac2) from the DC/AC converter 27 (inverter circuit 41). In addition, if a phase difference between the output voltage and the output current is kept the same, since the impedance becomes capacitive due to noise, a control error, and the like, the phase θv of the voltage Vac2 is advanced by a predetermined value with respect to the phase θi of the current Iac2 to secure safety. The predetermined value is called a phase margin. Here, when the impedance is L load and there is a predetermined phase margin and a predetermined amount of reflux current, the switching performed in the DC/AC converter 27 (inverter circuit 41) is called soft switching. The switching performed under other conditions is called hard switching. The reflux current is a current flowing in the power source by a counter electromotive force of the first coil 21 (see FIGS. 16(b), 16(c), 17(b) and 17(c)).

In the power characteristics illustrated in FIG. 5, the frequency fp is substantially constant irrespective of the magnitude of the input voltage Vc. In the power characteristics illustrated in FIG. 6, the frequency fp is increased as the input voltage Vc is decreased. In the power characteristics illustrated in FIG. 7, the frequency fp is decreased as the input voltage Vc is decreased. Such a difference in power characteristics is determined by characteristics of a resonance circuit (for example, a first coil 21 and a resonance circuit including a capacitor (not illustrated)) provided in the power transmitter 2.

The first controller 25 performs the discharge control by changing the frequency f of the DC/AC converter 27 (inverter circuit 41) so that the power supplied to the DC/AC converter 27 (inverter circuit 41) by the capacitor 42 becomes equal to or lower than the withstand power of the inverter circuit 41. As an example, in the discharge control, the first controller 25 changes the frequency f of the DC/AC converter 27 (inverter circuit 41) so that the impedance when seeing the power receiver 3 from the DC/AC converter 27 becomes inductive (L load). Hereinafter, the first discharge control to the third discharge control will be described.

(First Discharge Control)

Figure 8:
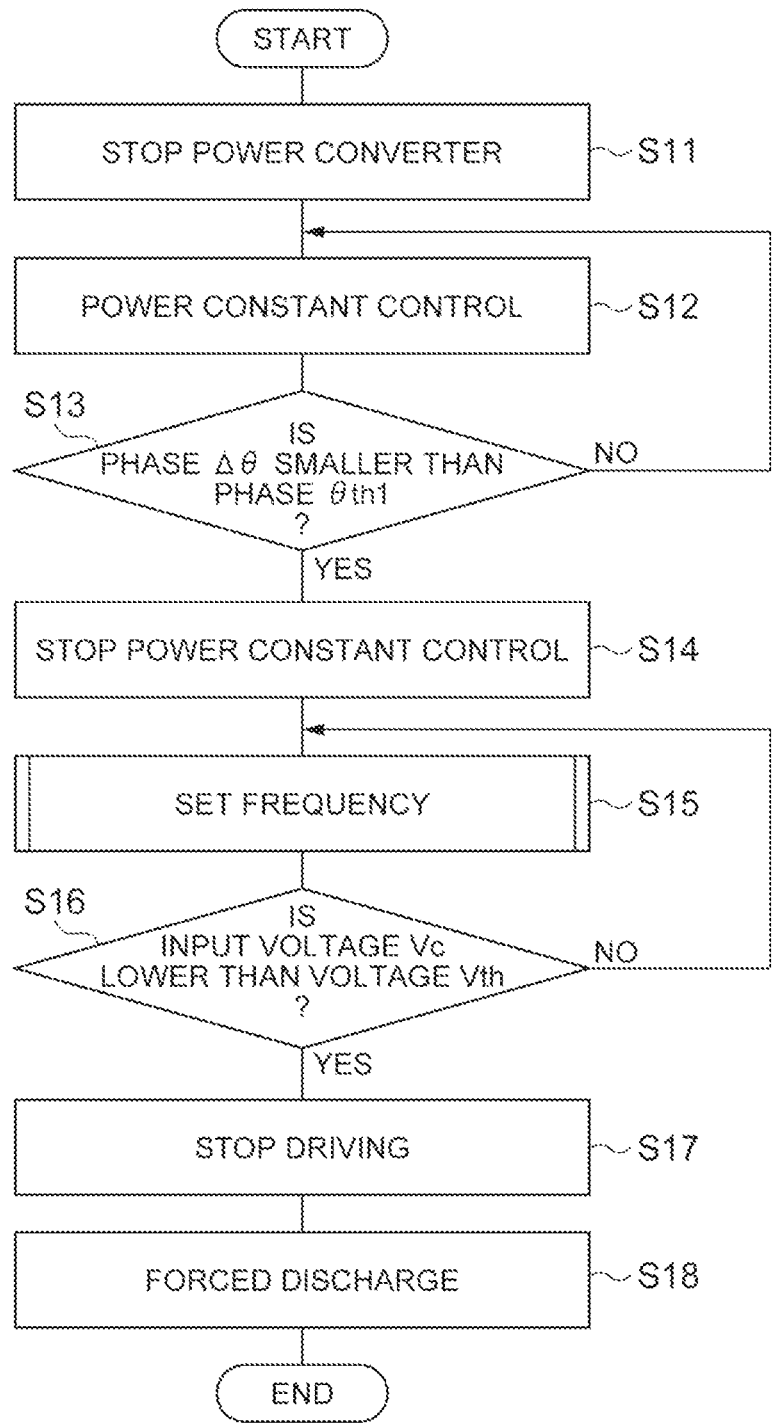
FIG. 8 is a flowchart illustrating a series of processing of a first discharge control.

Subsequently, the first discharge control performed by the first controller 25 will be described with reference to FIG. 3 and FIGS. 5 to 9(b). FIG. 8 is a flowchart illustrating a series of processing of the first discharge control. FIG. 9(a) is a flowchart illustrating in detail an example of frequency setting processing in FIG. 8. FIG. 9(b) is a flowchart illustrating in detail another example of the frequency setting processing in FIG. 8. The first discharge control is a control which discharges the electric charge accumulated in the capacitor 42 by continuously driving the inverter circuit 41 with changing the frequency f after performing the power constant control without changing from the first power command value immediately before stopping the power converter 26. The processing illustrated in FIG. 8 starts in response to reception of the charging stop request, for example, when the first controller 25 is performing normal power control. The input voltage Vc is measured by the first detector 23 (see FIG. 2) and output to the first controller 25.

First, the first controller 25 stops the power converter 26 (step S11). The first controller 25 performs the power constant control without changing from the first power command value immediately before stopping the power converter 26 (step S12). In other words, the first controller 25 changes the frequency f of the DC/AC converter 27 (inverter circuit 41) so that the AC power Pac2 becomes constant at the same magnitude as the AC power Pac2 output by the DC/AC converter 27 while the power converter 26 operates. At this time, since the power converter 26 stops, no electric charge is newly supplied to the capacitor 42. For this reason, the electric charge accumulated in the capacitor 42 is discharged by the power constant control. When the electric charge accumulated in the capacitor 42 is discharged, the input voltage Vc is decreased.

Subsequently, the first controller 25 calculates a phase $\Delta\theta$ which is the delay of the phase $\theta i$ of the current Iac2 with respect to the phase $\theta v$ of the voltage Vac2 detected by the first detector 23, and compares the phase $\Delta\theta$ with a phase $\theta th1$. The first controller 25 determines whether the phase $\Delta\theta$ is smaller than the predetermined phase $\theta th1$ (step S13). The phase $\theta th1$ is a lower limit threshold value of the phase $\Delta\theta$. The phase $\theta th1$ is the phase $\Delta\theta$ which the impedance does not become the C load, and is several degrees greater than the phase $\Delta\theta$ (0°) which is the boundary between the L load and the C load. The phase $\theta th1$ is preset. In step S13, if it is determined that the phase $\Delta\theta$ is equal to or greater than the phase $\theta th1$ (step S13; No), steps S12 and S13 are repeated. On the other hand, if it is determined in step S13 that the phase $\Delta\theta$ is smaller than the phase $\theta th1$ (step S13; Yes), there is the possibility that the impedance becomes the C load and the switching of the inverter circuit 41 becomes hard switching. For this reason, the first controller 25 stops the power constant control (step S14).

Specific examples of steps S11 to S14 will be described. For example, it is assumed that the first power command value is 3300 W and the input voltage Vc immediately after stopping the power converter 26 is the input voltage Vc1. In this case, as illustrated in FIG. 5, the first controller 25 controls the AC power Pac2 to be 3300 W by setting the frequency f to be a frequency f1. When the DC/AC converter 27 is operating in the state in which the frequency f is set to be the frequency f1, the electric charge accumulated in the capacitor 42 is discharged and the input voltage Vc is decreased. When the input voltage Vc is decreased, since the power characteristics are changed, the first controller 25 lowers the frequency f so that the AC power Pac2 is maintained at 3300 W. When the processing is repeated, the phase $\Delta\theta$ eventually becomes smaller than the phase $\theta th1$. At this time, the first controller 25 stops the power constant control.

Subsequently, the first controller 25 performs the frequency setting processing (step S15). In the frequency setting processing of step S15, as illustrated in FIG. 9(a), the first controller 25 acquires the input voltage Vc from the first detector 23 (step S21). Then, the first controller 25 sets the frequency f in accordance with the input voltage Vc (step S22). Specifically, the first controller 25 has a frequency table showing the correspondence relationship between the input voltage Vc and the frequency fp. The frequency table is preset by experiments or the like. In step S22, the first controller 25 sets the frequency f to be a frequency higher than the frequency fp by a predetermined frequency. The first controller 25 ends the frequency setting processing.

In the frequency setting processing of step S15, the processing illustrated in FIG. 9(b) may also be performed. Specifically, the first controller 25 acquires the phase $\Delta\theta$ (step S31). Then, the first controller 25 compares the phase $\Delta\theta$ with the phase $\theta th1$ and determines whether the phase $\Delta\theta$ is smaller than the phase $\theta th1$ (step S32). If it is determined that the phase $\Delta\theta$ is smaller than the phase $\theta th1$ (step S32; Yes), there is a possibility that the impedance when seeing the power receiver 3 from the DC/AC converter 27 becomes capacitive and the switching of the inverter circuit 41 becomes the hard switching. Therefore, the first controller 25 increases the frequency f by a predetermined frequency (step S33), and ends the frequency setting processing.

On the other hand, if it is determined in step S32 that the phase $\Delta\theta$ is equal to or greater than the phase $\theta th1$ (step S32; No), the first controller 25 compares the phase $\Delta\theta$ with a phase $\theta th2$, and determines whether the phase $\Delta\theta$ is greater than the phase $\theta th2$ (step S34). The phase $\theta th2$ is an upper limit threshold value of the phase $\Delta\theta$, and is greater than the phase $\theta th1$. The phase $\theta th2$ is preset. If it is determined that the phase $\Delta\theta$ is greater than the phase $\theta th2$ (step S34; Yes), the impedance when seeing the power receiver 3 from the DC/AC converter 27 becomes inductive, but since power consumed by the inverter circuit 41 is decreased, the first controller 25 lowers the frequency f by a predetermined frequency (step S35) and ends the frequency setting process. On the other hand, if it is determined in step S34 that the phase $\Delta\theta$ is equal to or smaller than the phase $\theta th2$ (step S34; No), the first controller 25 determines that the frequency f is appropriate and ends the frequency setting processing without changing the frequency f.

Subsequently, the first controller 25 compares the input voltage Vc with a predetermined voltage Vth to determine whether the input voltage Vc is lower than the voltage Vth (step S16). The voltage Vth is set to be a value indicating that the electric charge accumulated in the capacitor 42 is sufficiently discharged by the discharge control. The voltage Vth is set, for example, to the extent that the circuit scale of the forced discharge circuit 43 is not increased. Then, if it is determined that the input voltage Vc is equal to or higher than the voltage Vth (step S16; No), the first controller 25 again performs the frequency setting processing of step S15. On the other hand, if it is determined in step S16 that the input voltage Vc is lower than the voltage Vth (step S16; Yes), the first controller 25 stops driving the inverter circuit 41 (step S17).

Specific examples of steps S15 to S17 will be described. In the power transmitter 2 having the power characteristics illustrated in FIG. 5, since the frequency fp is substantially constant regardless of the magnitude of the input voltage Vc, a lower limit frequency fth1 which is the frequency f when the phase $\Delta\theta$ reaches the phase $\theta$th1 is substantially constant regardless of the magnitude of the input voltage Vc. Therefore, the first controller 25 sets the frequency f to be the lower limit frequency fth1 and continues to drive the inverter circuit 41. In the power transmitter 2 having the power characteristics illustrated in FIG. 6, since the frequency fp is increased as the input voltage Vc is decreased, the lower limit frequency fth1 is also increased as the input voltage Vc is decreased. Therefore, the first controller 25 continues to drive the inverter circuit 41 while increasing the frequency f as the input voltage Vc is decreased. In the power transmitter 2 having the power characteristics illustrated in FIG. 7, since the frequency fp is decreased as the input voltage Vc is decreased, the lower limit frequency fth1 and an upper limit frequency fth2 which is the frequency f when the phase $\Delta\theta$ reaches the phase $\theta$th2 are also decreased as the input voltage Vc is decreased. Therefore, the first controller 25 continues to drive the inverter circuit 41 while lowering the frequency f as the input voltage Vc is decreased. Then, when the input voltage Vc becomes lower than the voltage Vth, the first controller 25 stops driving the inverter circuit 41.

Then, the first controller 25 causes the forced discharge circuit 43 to discharge the capacitor 42 (step S18). Specifically, the first controller 25 outputs the forced discharge signal to the switching element 45 of the forced discharge circuit 43 to turn on the switching element 45, thereby forcibly discharging the electric charge accumulated in the capacitor 42 to the ground potential (GND). Then, the first controller 25 turns off the switching element 45 by the forced discharge signal in response to the input voltage Vc that is substantially zero, and ends a series of processing of the first discharge control.

In the frequency table, in place of the frequency fp, the relationship between the frequency between the lower limit frequency fth1 and the upper limit frequency fth2, and the input voltage Vc may be established.

(Second Discharge Control)

Figure 10:
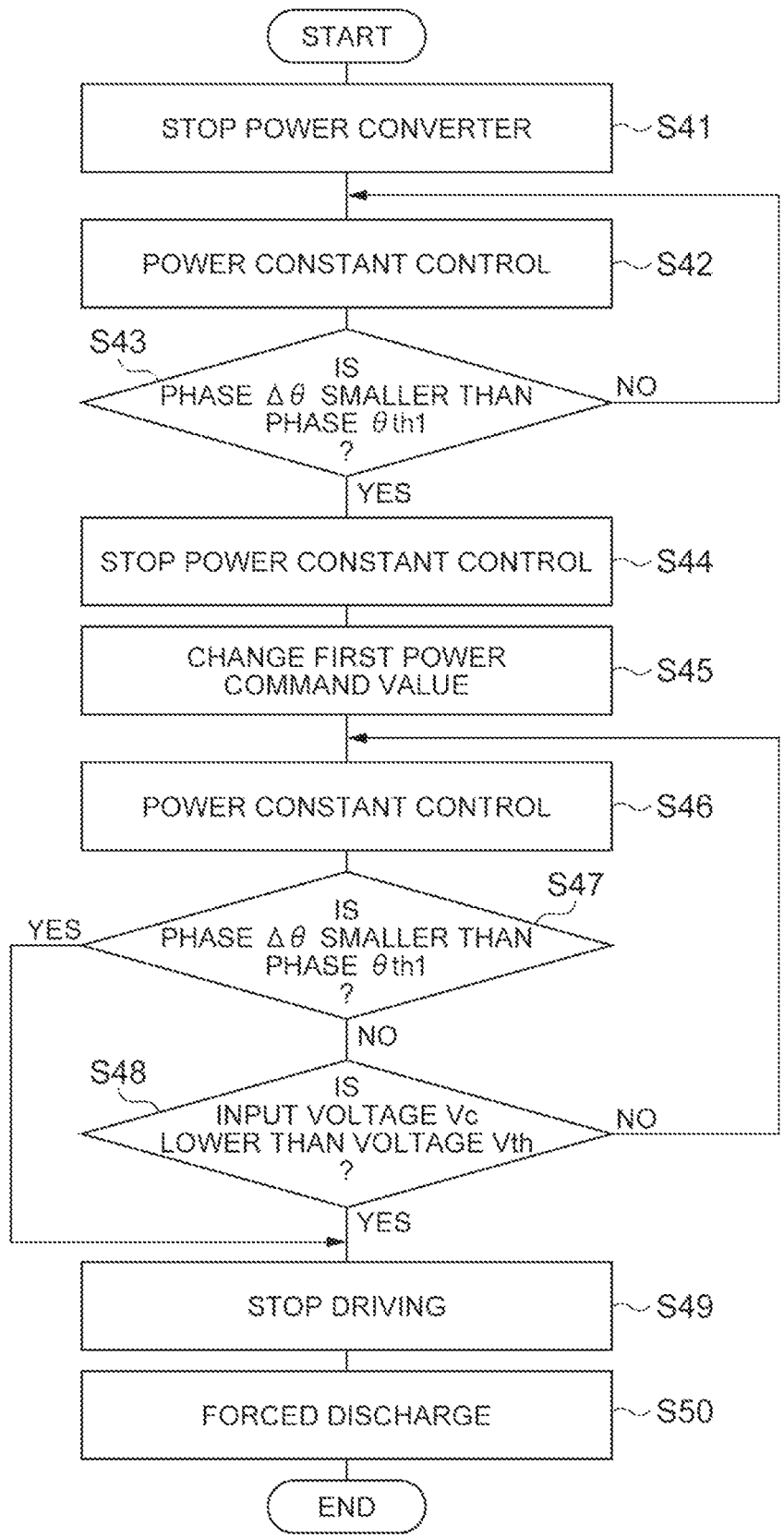
FIG. 10 is a flowchart illustrating a series of processing of a second discharge control.
Figure 11:
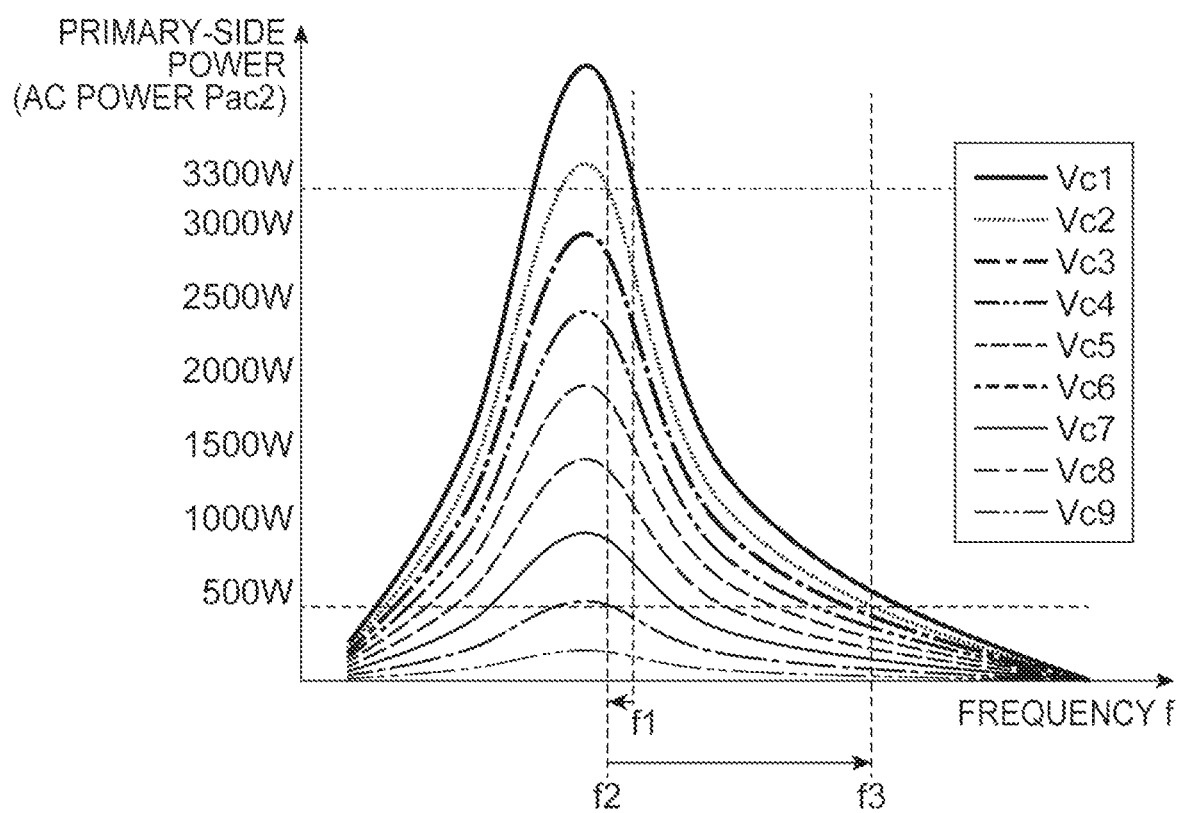
FIG. 11 is a diagram for explaining an operation in the second discharge control.

Next, the second discharge control performed by the first controller 25 will be described with reference to FIG. 3 and FIGS. 10 to 11. FIG. 10 is a flowchart illustrating a series of processing of the second discharge control. FIG. 11 is a diagram for explaining an operation in the second discharge control. The second discharge control is a control which discharges the electric charge accumulated in the capacitor 42 by continuously performing the power constant control by changing the first power command value after performing the power constant control without changing from the first power command value immediately before stopping the power converter 26. The processing illustrated in FIG. 10 starts in response to reception of the charging stop request, for example, when the first controller 25 is performing normal power control. The processing of steps S41 to S44 is the same as the processing of steps S11 to S14 of FIG. 8, respectively, and a description thereof will be omitted.

Subsequently, the first controller 25 performs the first power command value change processing (step S45). Specifically, the first controller 25 changes the first power command value to a value smaller than the first power command value of the power constant control stopping in step S44. The limit value by which the input voltage Vc can be decreased and the time required for the second discharge control are determined by the first power command value set in step S45. Therefore, the first power command value set in step S45 is determined in accordance with the specifications and the power characteristics of the power transmitter 2. Then, the first controller 25 performs the power constant control using the first power command value set in step S45 (step S46). In other words, in step S46, the first controller 25 changes the frequency f of the DC/AC converter 27 (inverter circuit 41) so that the AC power Pac2 becomes lower than the AC power Pac2 output by the DC/AC converter 27 while the power converter 26 operates. Then, the first controller 25 changes the frequency f so that the AC power Pac2 becomes a constant magnitude smaller than the AC power Pac2 output by the DC/AC converter 27 while the power converter 26 operates.

Then, similar to step S43, the first controller 25 compares the phase $\Delta\theta$ of the AC power Pac2 with the phase $\theta$th1 and determines whether the phase $\Delta\theta$ is smaller than the predetermined phase $\theta$th1 (step S47). If it is determined in step S47 that the phase $\Delta\theta$ is equal to or greater than the phase $\theta$th1 (step S47; No), the first controller 25 compares the input voltage Vc with the predetermined voltage Vth, and determines whether the input voltage Vc is lower than the voltage Vth (step S48). Then, if it is determined that the input voltage Vc is equal to or higher than the voltage Vth (step S48; No), the first controller 25 repeats the processing of steps S46 to S48.

On the other hand, if it is determined in step S47 that the phase $\Delta\theta$ is smaller than the phase $\theta$th1 (step S47; Yes), and if it is determined in step S48 that the input voltage Vc is lower than the voltage Vth (step S48; Yes), the first controller 25 stops driving the inverter circuit 41 (step S49). Then, similar to step S18 of FIG. 8, the first controller 25 causes the forced discharge circuit 43 to discharge the capacitor 42 (step S50). Then, the first controller 25 turns off the switching element 45 by the forced discharge signal in response to the input voltage Vc that is substantially zero, and ends a series of processing of the second discharge control.

For example, as illustrated in FIG. 11, it is assumed that the first power command value is 3300 W and the input voltage Vc immediately after stopping the power converter 26 is the input voltage Vc1. In this case, the first controller 25 controls the AC power Pac2 to be 3300 W by setting the frequency f to be a frequency f1. As the electric charge accumulated in the capacitor 42 is discharged, the input voltage Vc is decreased. At this time, the first controller 25 gradually decreases the frequency f from the frequency f1 so that the AC power Pac2 is constant at 3300 W. Then, when the frequency f reaches the frequency f2, the phase $\Delta\theta$ becomes smaller than the phase $\theta$th1. At this time, it is assumed that the input voltage Vc is the input voltage Vc2. Subsequently, the first controller 25 changes the first power command value to 500 W and sets the frequency f to be the frequency f3, thereby controlling the AC power Pac2 to be 500 W. The first controller 25 gradually decreases the frequency f from the frequency f3 so that the AC power Pac2 is constant at 500 W. Then, when the phase Δθ becomes smaller than the phase θth1, the first controller 25 stops driving the inverter circuit 41 and causes the forced discharge circuit 43 to discharge the capacitor 42.

Modified Example of Second Discharge Control

Figure 12:
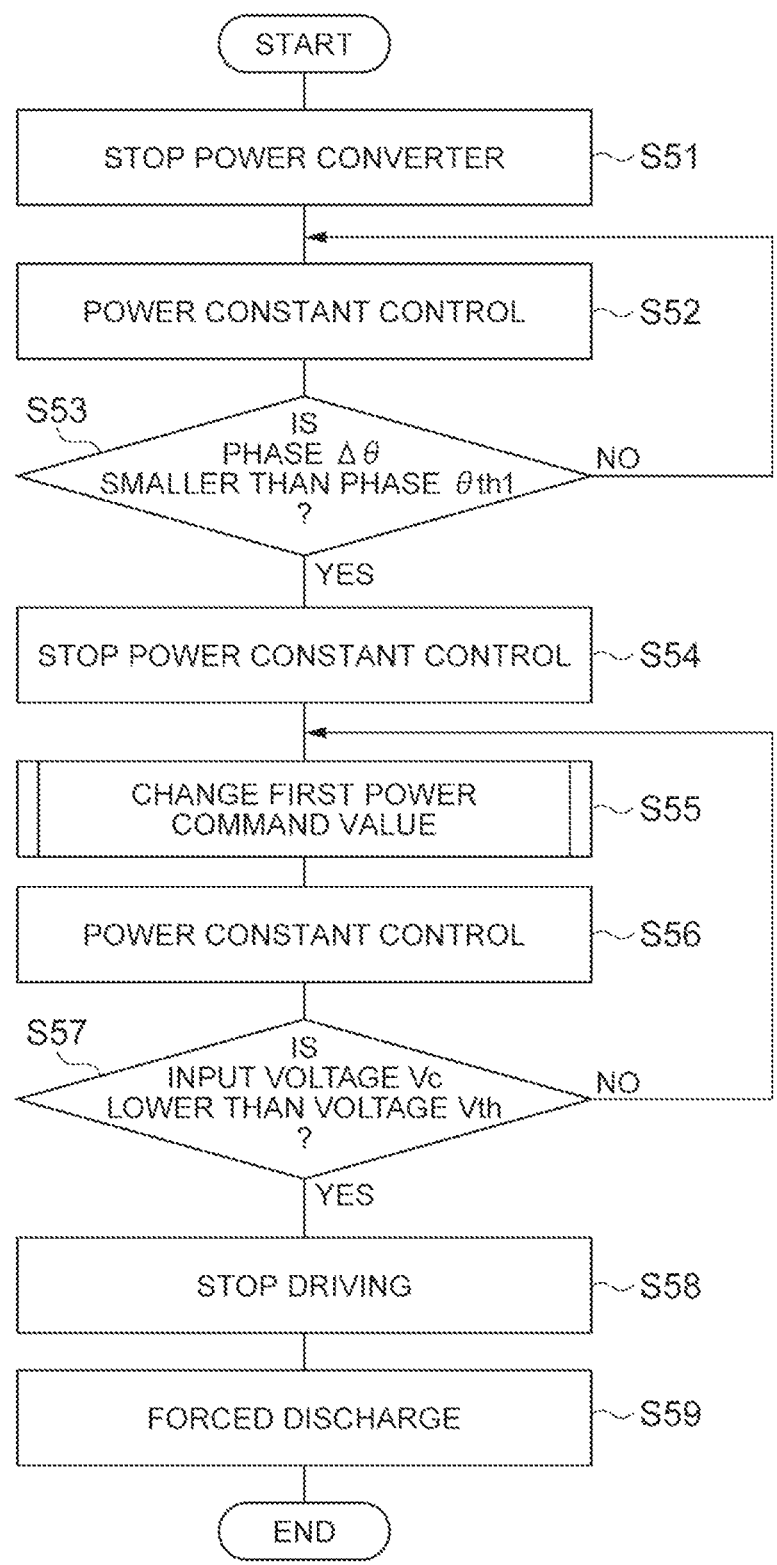
FIG. 12 is a flowchart illustrating a series of processing of a modified example of the second discharge control.
Figure 14:
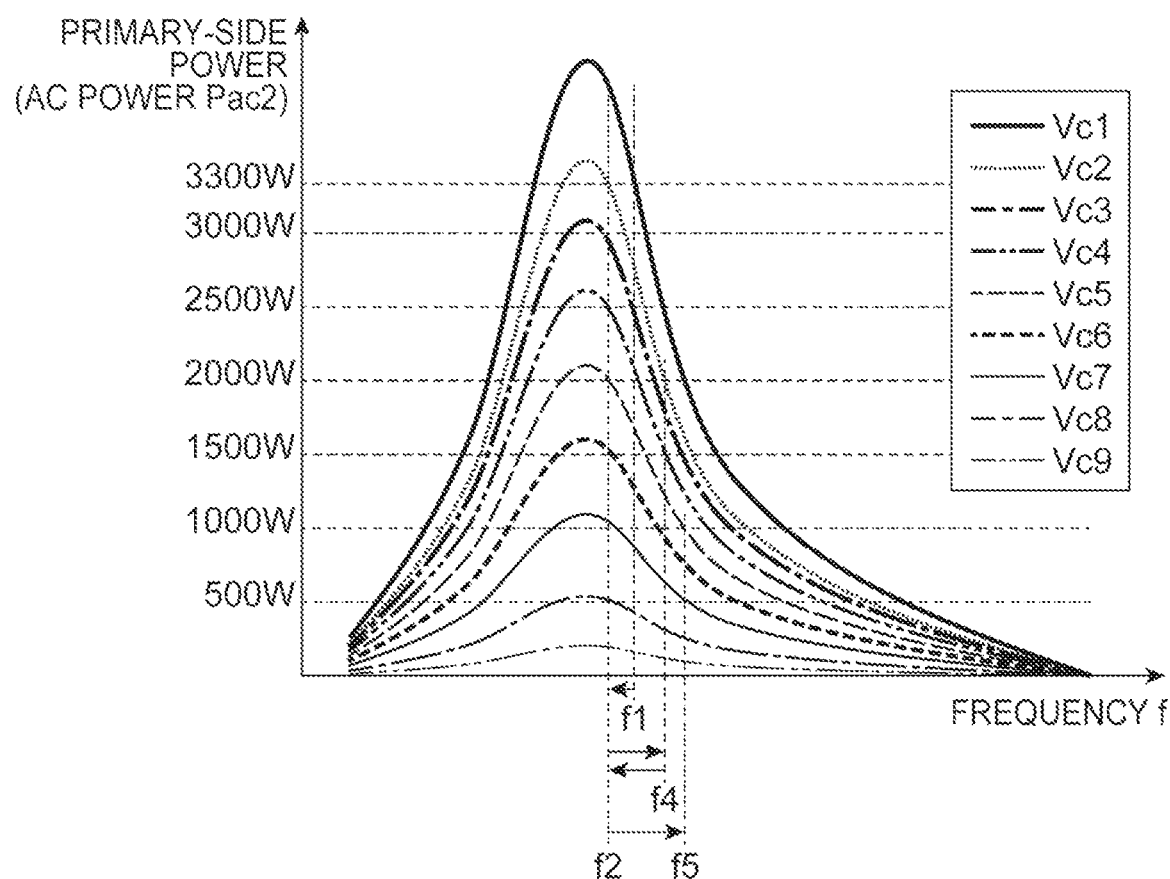
FIG. 14 is a diagram for explaining an operation in the modified example of the second discharge control.

Next, a modified example of the second discharge control performed by the first controller 25 will be described with reference to FIG. 3 and FIGS. 12 to 14. FIG. 12 is a flowchart illustrating a series of processing of the modified example of the second discharge control. FIG. 13(a) is a flowchart illustrating in detail an example of the first power command value change processing in FIG. 12. FIG. 13(b) is a flowchart illustrating in detail another example of the first power command value change processing in FIG. 12. FIG. 14 is a diagram for explaining an operation in the modified example of the second discharge control. In the modified example of the second discharge control, the first power command value is gradually decreased. The processing illustrated in FIG. 12 starts in response to reception of the charging stop request, for example, when the first controller 25 is performing normal power control. The processing of steps S51 to S54 is the same as the processing of steps S11 to S14 of FIG. 8, respectively, and a description thereof will be omitted.

Subsequently, the first controller 25 performs the first power command value change processing (step S55). In the first power command value change processing of step S55, as illustrated in FIG. 13(a), the first controller 25 acquires the input voltage Vc from the first detector 23 (step S61). Then, the first controller 25 sets the first power command value in accordance with the input voltage Vc (step S62). Specifically, the first controller 25 has a power command value table showing the relationship between the input voltage Vc and the first power command value. The power command value table is preset by experiments or the like. That is, in the power command value table, the first power command value is preset so that the phase Δθ becomes greater than the phase θth1 with respect to the input voltage Vc. In step S62, the first controller 25 refers to the power command value table to set the first power command value associated with the input voltage Vc. The first controller 25 ends the first power command value change processing.

In the first power command value change processing of step S55, the processing illustrated in FIG. 13(b) may be performed. Specifically, the first controller 25 acquires the phase Δθ (step S71). Then, the first controller 25 compares the phase Δθ with the phase θth1 and determines whether the phase Δθ is smaller than the phase θth1 (step S72). If it is determined that the phase Δθ is smaller than the phase θth1 (step S72; Yes), there is a possibility that the impedance when seeing the power receiver 3 from the DC/AC converter 27 becomes capacitive and the switching of the inverter circuit 41 becomes the hard switching. Therefore, the first controller 25 decreases the first power command value by the preset value (step S73), and ends the first power command value change processing. On the other hand, if it is determined in step S72 that the phase Δθ is equal to or greater than the phase θth1 (step S72; No), the first controller 25 ends the first power command value change processing without changing the first power command value.

Then, the first controller 25 performs the power constant control using the first power command value set in step S55 (step S56). In other words, in step S56, the first controller 25 changes the frequency f of the DC/AC converter 27 (inverter circuit 41) so that the AC power Pac2 becomes lower than the AC power Pac2 while the power converter 26 operates. Then, the first controller 25 changes the frequency f so that the AC power Pac2 becomes constant at a value smaller than the AC power Pac2 while the power converter 26 operates. Then, the first controller 25 compares the input voltage Vc with a predetermined voltage Vth to determine whether the input voltage Vc is lower than the voltage Vth (step S57). Then, if it is determined that the input voltage Vc is equal to or higher than the voltage Vth (step S57; No), the first controller 25 repeats the processing of steps S55 to S57.

On the other hand, if it is determined in step S57 that the input voltage Vc is lower than the voltage Vth (step S57; Yes), the first controller 25 stops driving the inverter circuit 41 (step S58). Then, similar to step S18 of FIG. 8, the first controller 25 causes the forced discharge circuit 43 to discharge the capacitor 42 (step S59). Then, the first controller 25 turns off the switching element 45 by the forced discharge signal in response to the input voltage Vc that is substantially zero, and ends a series of processing of the second discharge control.

For example, as illustrated in FIG. 14, it is assumed that the first power command value is 3300 W and the input voltage Vc immediately after stopping the power converter 26 is the input voltage Vc1. In this case, the first controller 25 controls the AC power Pac2 to be 3300 W by setting the frequency f to be a frequency f1. The electric charge accumulated in the capacitor 42 is discharged, and the input voltage Vc is decreased. At this time, the first controller 25 gradually decreases the frequency f from the frequency f1 so that the AC power Pac2 is constant at 3300 W. Then, when the frequency f reaches the frequency f2, the phase Δθ becomes smaller than the phase θth1. At this time, it is assumed that the input voltage Vc is the input voltage Vc2.

Subsequently, it is assumed that the first controller 25 changes the first power command value to 2000 W. In this case, the first controller 25 controls the AC power Pac2 to be 2000 W by setting the frequency f to be a frequency f4. The first controller 25 gradually decreases the frequency f from the frequency f4 so that the AC power Pac2 is constant at 2000 W. After the power constant control is performed based on the set first power command value for a while, if the input voltage Vc is equal to or higher than the voltage Vth, the first controller 25 further changes the first power command value. At this time, it is assumed that the first controller 25 changes the first power command value to 1000 W. In this case, the first controller 25 controls the AC power Pac2 to be 1000 W by setting the frequency f to be a frequency f5. Then, the first controller 25 performs the power constant control so that the AC power Pac2 is constant at 1000 W. In this way, the above process is repeated until the input voltage Vc becomes lower than the voltage Vth, and the first power command value is gradually decreased. Then, when the input voltage Vc becomes lower than the voltage Vth, the first controller 25 stops driving the inverter circuit 41 and causes the forced discharge circuit 43 to discharge the capacitor 42.

(Third Discharge Control)

Figure 15:
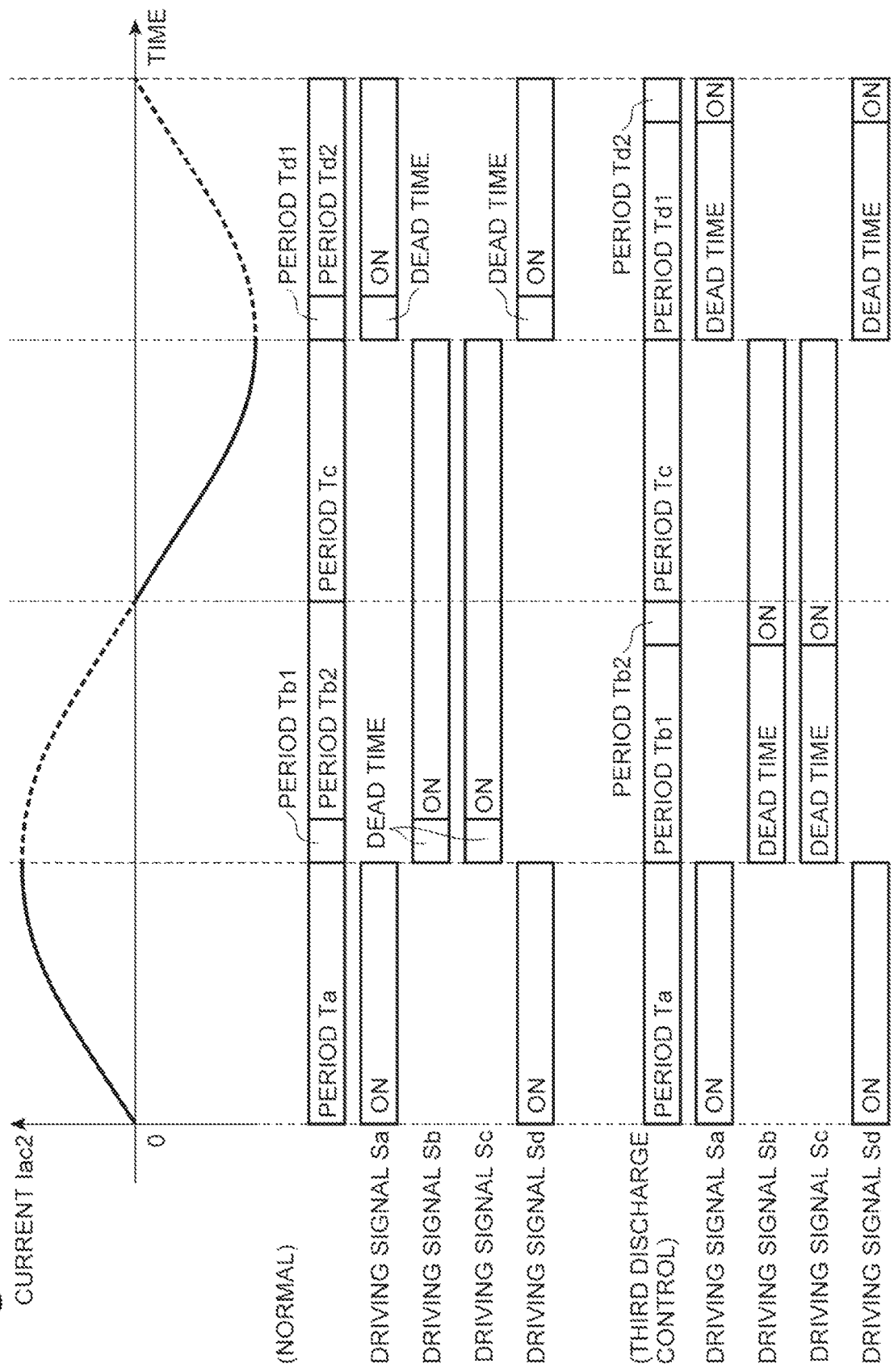
FIG. 15 is a diagram illustrating a state of each switching element included in an inverter circuit.
Figure 16:
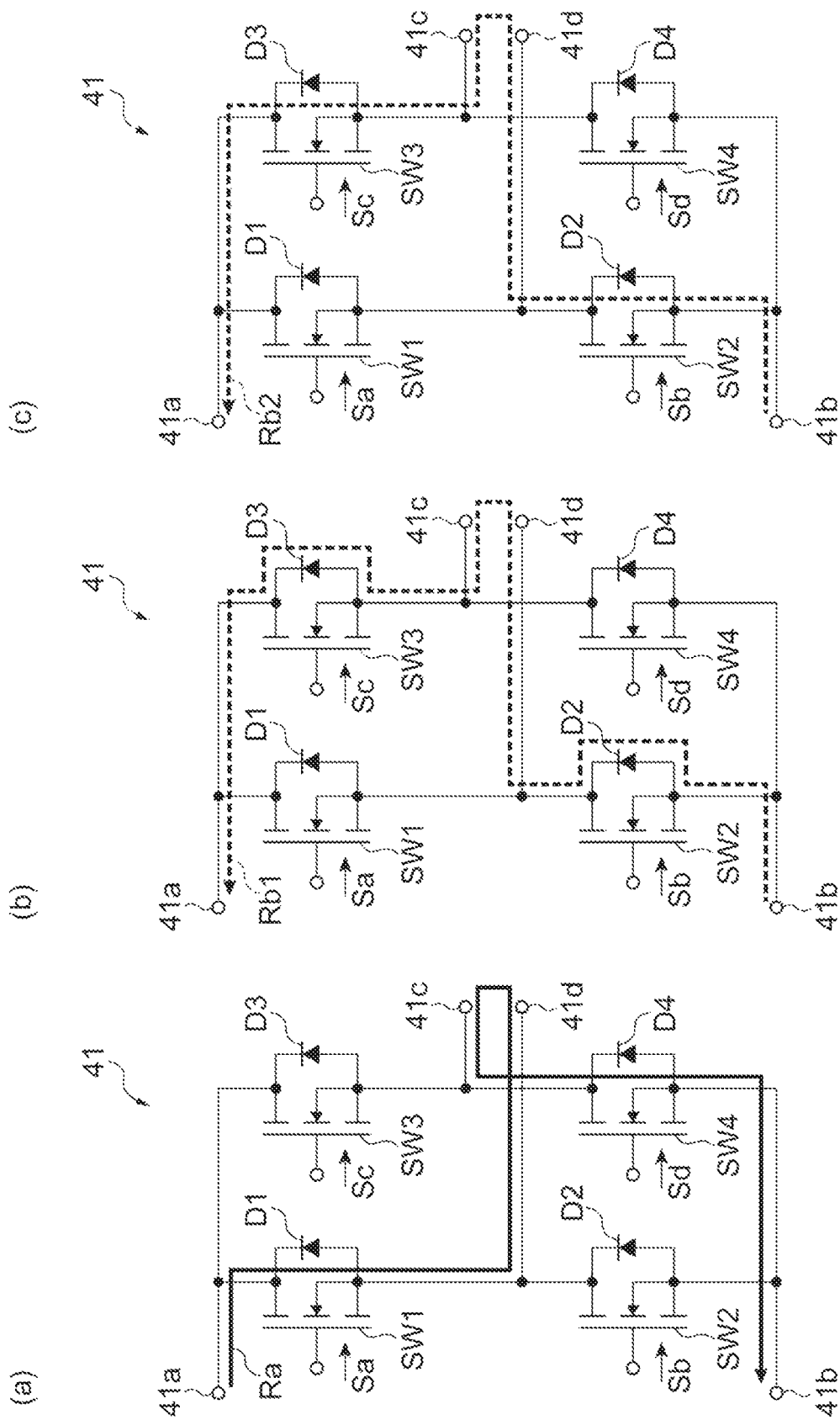
FIGS. 16(*a*) to 16(*c*) are diagrams illustrating a current flowing in the inverter circuit.
Figure 17:
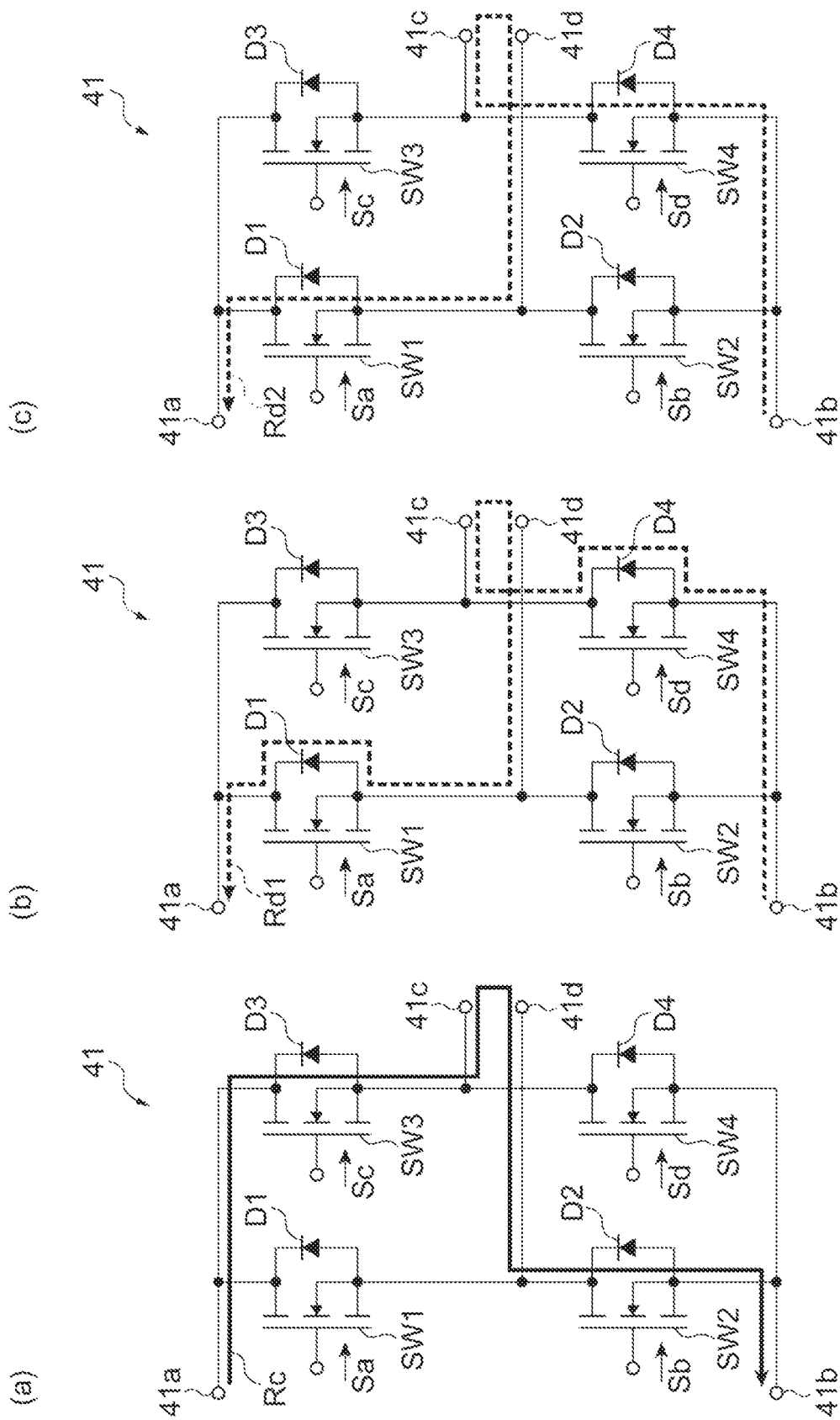
FIGS. 17(*a*) to 17(*c*) are diagrams illustrating the current flowing in the inverter circuit.

Next, a third discharge control performed by the first controller 25 will be described with reference to FIGS. 3 and 4 and FIGS. 15 to 17(c). FIG. 15 is a diagram illustrating a state of each switching element included in an inverter circuit. FIGS. 16(a) to 16(c) and FIGS. 17(a) to 17(c) are diagrams illustrating the current flowing in the inverter circuit. The third discharge control is a control which discharges the electric charge accumulated in the capacitor 42 by adjusting the switching timing of the on/off states of the switching elements SW1 to SW4 included in the inverter circuit 41.

As illustrated in FIG. 15, the operation of the inverter circuit 41 can be divided into periods Ta to Td in accordance with a current path through which a current flows in the inverter circuit 41. In the period Ta, the first controller 25 supplies the driving signals Sa and Sd, and the switching elements SW1 and SW4 are in the on state. Since the first controller 25 does not supply the driving signals Sb and Sc, the switching elements SW2 and SW3 are in the off state. At this time, as illustrated in FIG. 16(a), the current Iac2 flows in a current path Ra reaching an input terminal 41b through the switching element SW1, the output terminal 41d, the first coil 21 (see FIG. 3), the output terminal 41c, and the switching element SW4 in this order from the input terminal 41a. That is, the current Iac2 flows in the switching elements SW1 and SW4 in a forward direction.

Subsequently, in the period Tb, the first controller 25 first stops the supply of the driving signals Sa and Sd to turn off the switching elements SW1 and SW4. At this time, since the first controller 25 does not also supply the driving signals Sb and Sc, the switching elements SW2 and SW3 are also kept in the off state (period Tb1). The period Tb1 is referred to as a dead time. However, since the first coil 21 continues to make the current Iac2 flow in the same direction as the period Ta by the counter electromotive force, as illustrated in FIG. 16(b), the current Iac2 flows in a current path Rb1 reaching the input terminal 41a through the diode D2, the output terminal 41d, the first coil 21 (see FIG. 3), the output terminal 41c, and the diode D3 in this order from the input terminal 41b.

Then, after the dead time has elapsed, the first controller 25 supplies the driving signals Sb and Sc to turn on the switching elements SW2 and SW3. At this time, since the first controller 25 does not supply the driving signals Sa and Sd, the switching elements SW1 and SW4 are in the off state (period Tb2). In this state, as illustrated in FIG. 16(c), the current Iac2 flows in a current path Rb2 reaching the input terminal 41a through the switching element SW2, the output terminal 41d, the first coil 21 (see FIG. 3), the output terminal 41c, and the switching element SW3 in this order from the input terminal 41b. That is, the current Iac2 flows in the switching elements SW2 and SW3 in a reverse direction.

Subsequently, in the period Tc, the first controller 25 continues to supply the driving signals Sb and Sc, and the switching elements SW2 and SW3 are kept in the on state. In addition, the first controller 25 continues to stop supplying the driving signals Sa and Sd, and the switching elements SW1 and SW4 are kept in the off state. However, the counter electromotive force of the first coil 21 disappears, and the current Iac2 flows in the first coil 21 in a direction opposite to the direction in the periods Ta and Tb. That is, as illustrated in FIG. 17(a), the current Iac2 flows in a current path Rc reaching the input terminal 41b through the switching element SW3, the output terminal 41c, the first coil 21 (see FIG. 3), the output terminal 41d, and the switching element SW2 in this order from the input terminal 41a. That is, the current Iac2 flows in the switching elements SW2 and SW3 in a forward direction.

Subsequently, in the period Td, the first controller 25 first stops the supply of the driving signals Sb and Sc to turn off the switching elements SW2 and SW3. At this time, since the first controller 25 does not also supply the driving signals Sa and Sd, the switching elements SW1 and SW4 are also kept in the off state (period Td1). The period Td1 is referred to as a dead time as in the period Tb1. However, since the first coil 21 continues to make the current Iac2 flow in the same direction as the period Tc by the counter electromotive force, as illustrated in FIG. 17(b), the current Iac2 flows in a current path Rd1 reaching the input terminal 41a through the diode D4, the output terminal 41c, the first coil 21 (see FIG. 3), the output terminal 41d, and the diode D1 in this order from the input terminal 41b.

Then, after the dead time has elapsed, the first controller 25 supplies the driving signals Sa and Sd to keep the switching elements SW1 and SW4 in the on state. At this time, since the first controller 25 does not supply the driving signals Sb and Sc, the switching elements SW2 and SW3 are in the off state (period Td2). In this state, as illustrated in FIG. 17(c), the current Iac2 flows in a current path Rd2 reaching the input terminal 41a through the switching element SW4, the output terminal 41c, the first coil 21 (see FIG. 3), the output terminal 41d, and the switching element SW1 in this order from the input terminal 41b. That is, the current Iac2 flows in the switching elements SW1 and SW4 in a reverse direction.

In the inverter circuit 41, the operations corresponding to the above-described periods Ta to Td are repeated in order.

As described above, in the period Tb1 and the period Td1, the current Iac2 flows through the diode. Therefore, in the period Tb1 and the period Td1, the power loss is increased by a forward voltage of the diode. In the third discharge control, the electric charge accumulated in the capacitor 42 is discharged by using the relationship. Specifically, the first controller 25 supplies the driving signals Sa to Sd so that the dead time becomes longer than under the normal control of the inverter circuit 41. That is, the first controller 25 supplies the driving signals Sa to Sd so that the periods Tb1 and Td1 become longer than under the normal control of the inverter circuit 41. The length of the dead time in the third discharge control is preset. In other words, the first controller 25 sets the time during which the switching element electrically connected in parallel with the diode is kept in the off state during a period in which the current Iac2 flows in the same direction as the forward direction of the diode under the third discharge control to be longer than the time during which the switching element electrically connected in parallel with the diode is kept in the off state during a period in which the current Iac2 flows in the same direction as the forward direction of the diode while the power converter 26 operates.

In the period Tb, the first controller 25 stops the supply of the driving signals Sa and Sd and starts a timer, and if it is determined that the time corresponding to the preset dead time has elapsed, the first controller 25 supplies the driving signals Sb and Sc. Similarly, in the period Td, the first controller 25 stops the supply of the driving signals Sb and Sc and starts the timer, and if it is determined that the time corresponding to the preset dead time has elapsed, the first controller 25 supplies the driving signals Sa and Sd.

In the wireless power transfer system 1 and the power transmitter 2, even after the power converter 26 stops, the DC/AC converter 27 continues to be driven so that the power supplied to the DC/AC converter 27 by the capacitor 42 is equal to or lower than withstand power of the DC/AC converter 27. Therefore, it is possible to continue to consume power (electric charge) accumulated in the capacitor 42 without increasing the withstand power of the DC/AC converter 27 (inverter circuit 41). As a result, the capacitor 42 can be discharged without increasing the size of the DC/AC converter 27 (inverter circuit 41). As a result, since the withstand voltage of the resistance element 44 and the switching element 45 of the forced discharge circuit 43 can be decreased, the resistance element 44 and the switching element 45 can be downsized. Furthermore, the forced discharge circuit 43 can be omitted.

When the impedance when seeing the power receiver 3 from the DC/AC converter 27 is capacitive (C load), the switching of the DC/AC converter 27 (inverter circuit 41) can be the hard switching. Therefore, by making the impedance when seeing the power receiver 3 from the DC/AC converter 27 inductive (L load), the switching of the DC/AC converter 27 (inverter circuit 41) can be the soft switching. Therefore, it is possible to continue to discharge electric charge accumulated in the capacitor 42 without increasing the withstand power of the DC/AC converter 27 (inverter circuit 41). As a result, the capacitor 42 can be discharged without increasing the size of the DC/AC converter 27 (inverter circuit 41).

In the first discharge control (step S12), the second discharge control (steps S42 and S46), and the modified example of the second discharge control (steps S52 and S56), the frequency f of the DC/AC converter 27 is changed so that the AC current Pac2 is constant. In this case, the power constant control for keeping the AC power Pac2 constant can be continued. As a result, it is possible to discharge the capacitor 42 using the power constant control even after the power converter 26 stops. In addition, since the AC power Pac2 having a certain magnitude is output from the DC/AC converter 27 by the power constant control, the capacitor 42 is discharged at a constant rate. For this reason, it is possible to efficiently discharge the capacitor 42.

In the second discharge control (step S46) and the modified example of the second discharge control (step S56), the frequency f of the DC/AC converter 27 is changed so that the AC power Pac2 becomes lower than the AC power Pac2 during the operation period of the power converter 26. As the magnitude of the AC power Pac2 converted by the DC/AC converter 27 is decreased, the phase θi of the current Iac2 is delayed with respect to the phase θv of the voltage Vac2. Therefore, it is possible to lengthen the time when the DC/AC converter 27 (inverter circuit 41) can be driven by the soft switching. This makes it possible to discharge the capacitor 42 more reliably.

In the inverter circuit 41, when the switching element electrically connected in parallel with the diode is turned off during the period in which the current Iac2 flows in the same direction as the forward direction of the diode, power is consumed in the DC/AC converter 27 (inverter circuit 41) as much as the forward voltage drop of the diode. In third discharge control, by making the period during which the switching element is kept in the off state longer than the period during which the switching element is kept in the off state while the power converter 26 operates, it is possible to increase the power consumption in the DC/AC converter 27 (inverter circuit 41) and to efficiently discharge the capacitor 42.

Although the embodiment of the present disclosure has been described above, the present invention is not limited to the above embodiments. For example, the wireless power transfer system 1 is applicable not only to the electric vehicle EV but also to a movable object such as a plug-in hybrid vehicle and an underwater sailing body as well as a non-movable object.

In the above embodiments, although the capacitor 42 which is subjected to the discharge control is included in the DC/AC converter 27, the arrangement of the capacitor 42 is not limited thereto. The capacitor 42 just has to be provided at the input of the DC/AC converter 27, may be provided between the power converter 26 and the DC/AC converter 27, and may be included in the power converter 26. That is, the capacitor 42 provided at the input of the DC/AC converter 27 means a capacitor provided between the rectifier circuit of the power converter 26 and the inverter circuit 41. In addition, the forced discharge circuit 43 may not be included in the DC/AC converter 27.

In addition, the first controller 25 may perform the discharge control so that the power supplied to the DC/AC converter 27 (inverter circuit 41) by the capacitor 42 becomes lower than the withstand power of the inverter circuit 41, and the switching of the inverter circuit 41 may be the hard switching. Even in such a case, if the power supplied by the capacitor 42 is equal to or lower than the withstand power of the DC/AC converter 27 (inverter circuit 41), it is possible to discharge the capacitor 42 without increasing the size of the DC/AC converter 27 (inverter circuit 41).

In addition, the first discharge control and the third discharge control may be executed in combination, or the second discharge control or the modified example thereof and the third discharge control may be executed in combination.

Further, in the first discharge control, steps S12 and S13 may be omitted. Further, in the first discharge control, steps S15 and S16 may be omitted.

Further, in the second discharge control, steps S42 and S43 may be omitted. Further, in the modified example of the second discharge control, steps S52 and S53 may be omitted.

Further, when the DC/AC converter 27 does not include the forced discharge circuit 43, steps S18, S50, and S59 are omitted.

Figure 18:
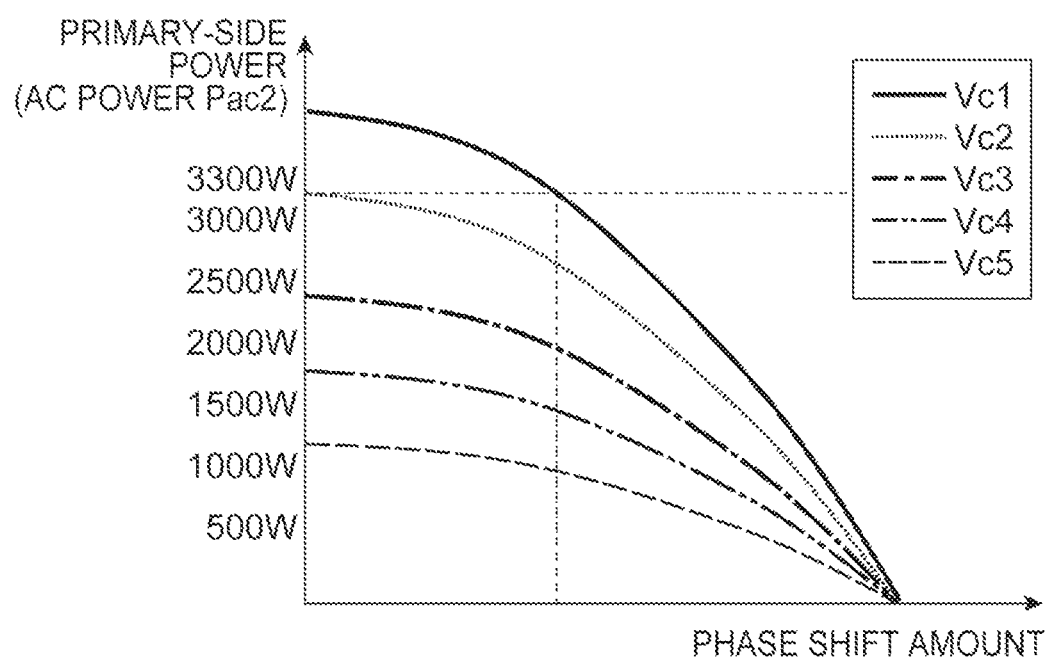
FIG. 18 is a diagram for explaining a phase shift control.

In addition, in the first discharge control, the second discharge control, and the modified example of the second discharge control, the frequency control which changes the frequency f of the inverter circuit 41 is used, but the discharge control is not limited thereto. For example, the phase shift control may be used, and at least one of the frequency control and the phase shift control may be used. As illustrated in FIG. 18, the first controller 25 can decrease the power of the AC power Pac2 by increasing the phase shift amount of the DC/AC converter 27 (inverter circuit 41). The phase shift amount is a deviation amount between the driving time of the switching element SW1 and the driving time of the switching element SW4 (or a deviation amount between the driving time of the switching element SW2 and the driving time of the switching element SW3).

For example, the first controller 25 adjusts the supply time of the driving signals Sa to Sd to the switching elements SW1 to SW4 included in the inverter circuit 41 to adjust the time to turn on each of the switching elements SW1 to SW4. When the driving time of the switching element SW1 and the driving time of the switching element SW4 are the same as each other and the driving time of the switching element SW2 and the driving time of the switching element SW3 are the same as each other, the conducting period (on period) of the inverter circuit 41 becomes longest. As the driving time of the switching element SW1 and the driving time of the switching element SW4 deviate from each other (as the driving time of the switching element SW2 and the driving time of the switching element SW3 deviate from each other), the on period of the inverter circuit 41 is getting shorter. As the on period of the inverter circuit 41 becomes short, the AC power Pac2 is decreased.

That is, in the first discharge control, the second discharge control, and the modified example of the second discharge control, the first controller 25 may change the phase shift amount instead of changing the frequency f. In this case, the first controller 25 performs the power constant control by changing, for example, the phase shift amount. That is, as the input voltage Vc is decreased, the first controller 25 decreases the phase shift amount in order to bring the magnitude of the AC power Pac2 close to the first power command value. Further, the first controller 25 may change both of the frequency f and the phase shift amount.

Further, in the above embodiments, although the wireless power transfer system in the case in which the power source PS is an AC power source has been described, the power source PS may be a DC power source. Although the type of the DC power source is not particularly limited, the DC power source may be a photovoltaic power generation device, a power storage device, and the like, for example. In this case, the power converter 26 can be the DC/DC converter that converts the DC power from the DC power source into the desired DC power. Further, when the DC power source can supply the desired DC power, the power converter 26 may be a circuit breaker (a switch, a relay, and the like) which controls whether the power from the DC power source flows in the DC/AC converter 27. In the present specification, the "power converter that converts power supplied from the power source into DC power" also includes the circuit breaker as described above.

REFERENCE SIGNS LIST 1 wireless power transfer system
2 power transmitter
3 power receiver
4 first coil device
5 second coil device
21 first coil
22 first converter
23 first detector
24 first communication device
25 first controller
26 power converter
27 DC/AC converter
31 second coil
32 second converter
33 second detector
34 second communication device
35 second controller
41 inverter circuit
41a input terminal
41b input terminal
41c output terminal
41d output terminal
42 capacitor
43 forced discharge circuit
44 resistance element
45 switching element
D1 to D4 diode
EV electric vehicle
Idc current
Iout load current
L load
Pdc DC power
Pout load power
PS power source
R road surface
Sa driving signal
Sb driving signal
Sc driving signal
Sd driving signal
SW1 to SW4 switching element Vc input voltage
Vdc voltage
Vout load voltage

The invention claimed is:

1. A power transmitter for wirelessly supplying power to a power receiver, comprising:
   a power converter configured to convert power supplied from a power source into DC power;
   a DC/AC converter configured to convert the DC power into AC power;
   a capacitor configured to be provided at an input of the DC/AC converter; and
   a controller configured to perform a discharge control of the capacitor after the power converter stops,
   wherein the controller performs the discharge control by changing at least one of a driving frequency and a phase shift amount of the DC/AC converter so that power supplied to the DC/AC converter by the capacitor is equal to or lower than withstand power of the DC/AC converter.

2. The power transmitter according to claim 1, wherein in the discharge control, the controller changes at least one of the driving frequency and the phase shift amount of the DC/AC converter so that impedance when seeing the power receiver from the DC/AC converter becomes inductive.

3. The power transmitter according to claim 2, wherein in the discharge control, the controller changes at least one of the driving frequency and the phase shift amount of the DC/AC converter so that the AC power is constant.

4. The power transmitter according to claim 3, wherein the DC/AC converter includes a switching element and a diode electrically connected in parallel with the switching element, and
   in the discharge control, the controller sets a period during which a current flows in the same direction as a forward direction of the diode and the switching element is kept in an off state to be longer than a period during which a current flows in the same direction as a forward direction of the diode and the switching element is kept in an off state while the power converter operates.

5. The power transmitter according to claim 2, wherein in the discharge control, the controller changes at least one of the driving frequency and the phase shift amount of the DC/AC converter so that the AC power is lower than AC power converted by the DC/AC converter while the power converter operates.

6. The power transmitter according to claim 5, wherein the DC/AC converter includes a switching element and a diode electrically connected in parallel with the switching element, and
   in the discharge control, the controller sets a period during which a current flows in the same direction as a forward direction of the diode and the switching element is kept in an off state to be longer than a period during which a current flows in the same direction as a forward direction of the diode and the switching element is kept in an off state while the power converter operates.

7. The power transmitter according to claim 2, wherein the DC/AC converter includes a switching element and a diode electrically connected in parallel with the switching element, and
   in the discharge control, the controller sets a period during which a current flows in the same direction as a forward direction of the diode and the switching element is kept in an off state to be longer than a period during which a current flows in the same direction as a forward direction of the diode and the switching element is kept in an off state while the power converter operates.

* * * * *